US006415316B1

(12) United States Patent
Van Der Meer

(10) Patent No.: US 6,415,316 B1
(45) Date of Patent: Jul. 2, 2002

(54) METHOD AND APPARATUS FOR IMPLEMENTING A WEB PAGE DIARY

(75) Inventor: Joannes Jozef Everardus Van Der Meer, Amersfoort (NL)

(73) Assignee: AIdministrator Nederland B.V., Amersfoort (NL)

( * ) Notice: Subject to any disclaimer, the term of this patent is extended or adjusted under 35 U.S.C. 154(b) by 0 days.

(21) Appl. No.: 09/144,655

(22) Filed: Sep. 1, 1998

(51) Int. Cl.[7] .................. G06F 15/177; G06F 13/38
(52) U.S. Cl. ................... 709/203; 709/217; 705/8; 707/501; 707/513; 707/526; 713/166; 713/167
(58) Field of Search .................. 713/166, 176, 713/183, 170, 201, 178, 167; 364/40; 395/200; 705/26, 8, 9; 709/213, 202, 203, 220, 221, 222, 217, 218, 219; 707/7, 501, 500, 512, 513, 526, 9

(56) References Cited

U.S. PATENT DOCUMENTS

| | | | |
|---|---|---|---|
| 5,109,515 A | | 4/1992 | Laggis et al. |
| 5,182,705 A | * | 1/1993 | Barr et al. ................... 364/401 |
| 5,515,496 A | | 5/1996 | Kaehler et al. ............. 395/159 |
| 5,666,501 A | | 9/1997 | Jones et al. |
| 5,778,368 A | | 7/1998 | Hogan et al. ................. 707/10 |
| 5,802,530 A | | 9/1998 | Van Hoff .................... 707/513 |
| 5,815,661 A | | 9/1998 | Gosling ................. 395/200.46 |
| 5,832,274 A | | 11/1998 | Cutler et al. |
| 5,859,969 A | | 1/1999 | Oki et al. |
| 5,870,562 A | | 2/1999 | Butman et al. |
| 5,881,236 A | | 3/1999 | Dickey |
| 5,892,905 A | | 4/1999 | Brandt et al. |
| 5,903,762 A | | 5/1999 | Sakamoto et al. |
| 5,923,846 A | * | 7/1999 | Gage et al. .................. 395/200 |
| 5,926,623 A | * | 7/1999 | Tsukakoshi et al. ........ 709/200 |
| 5,926,798 A | * | 7/1999 | Carter ......................... 705/26 |
| 5,956,027 A | | 9/1999 | Krishnamurthy ............ 345/329 |
| 5,987,506 A | * | 11/1999 | Carter et al. ................ 709/213 |
| 6,006,227 A | * | 12/1999 | Freeman et al. ............... 707/7 |
| 6,014,134 A | | 1/2000 | Bell et al. .................... 345/329 |
| 6,021,426 A | | 2/2000 | Douglis et al. ............. 709/200 |
| 6,076,166 A | | 6/2000 | Moshfeghi et al. ......... 713/201 |
| 6,081,829 A | | 6/2000 | Sidana ........................ 709/203 |
| 6,085,229 A | | 7/2000 | Newman et al. ............ 709/203 |
| 6,092,074 A | | 7/2000 | Rodkin et al. .............. 707/102 |
| 6,151,621 A | | 11/2000 | Colyer et al. ............... 709/204 |
| 6,161,112 A | | 12/2000 | Cragun et al. .............. 707/501 |
| 6,185,587 B1 | | 2/2001 | Bernardo et al. ........... 707/513 |
| 6,219,668 B1 | | 4/2001 | Arnaud et al. ................ 707/10 |

OTHER PUBLICATIONS

Tyler et al. Microsoft FrontPage 98 (Laura Lemay's Web Workshop); Nov. 1997, pp. 21–53, 529–542, 577–593, 617–632.

\* cited by examiner

Primary Examiner—Mark H. Rinehart
Assistant Examiner—William C. Vaughn, Jr.
(74) Attorney, Agent, or Firm—Fenwick & West LLP

(57) ABSTRACT

A method and apparatus to create a "diary" containing multimedia references to contents of Websites. These references (also called addresses) can be to, for example, text, bookmarks, images, programs, movies, etc. Many content objects are provided via the Websites of "content providers," with the specific intent of making the content objects available to a user to place in his diary. Each diary page has a format specified by a cover. The cover is provided by a cover provider and specifies where on the diary page the diary owner can place his content. The name "diary" arises because the invention preferably allows the user to save these references in association with dates and/or times. The pages of a user's diary may be navigated like a book, moving forward and backward through the pages or jumping to a particular page. In addition to storing references to Web information, the user can also jot down reminders, enter appointments, and birthdays, etc. for dates. A user is allowed to choose a visual "theme" for the pages of his diary. This theme can be changed at any time by the user and reflects how the user wants to present himself and his diary to the world. The user can set various levels of privacy for different portions of his diary.

39 Claims, 23 Drawing Sheets

An Exemplary Diary Implementation (shows logical connections)

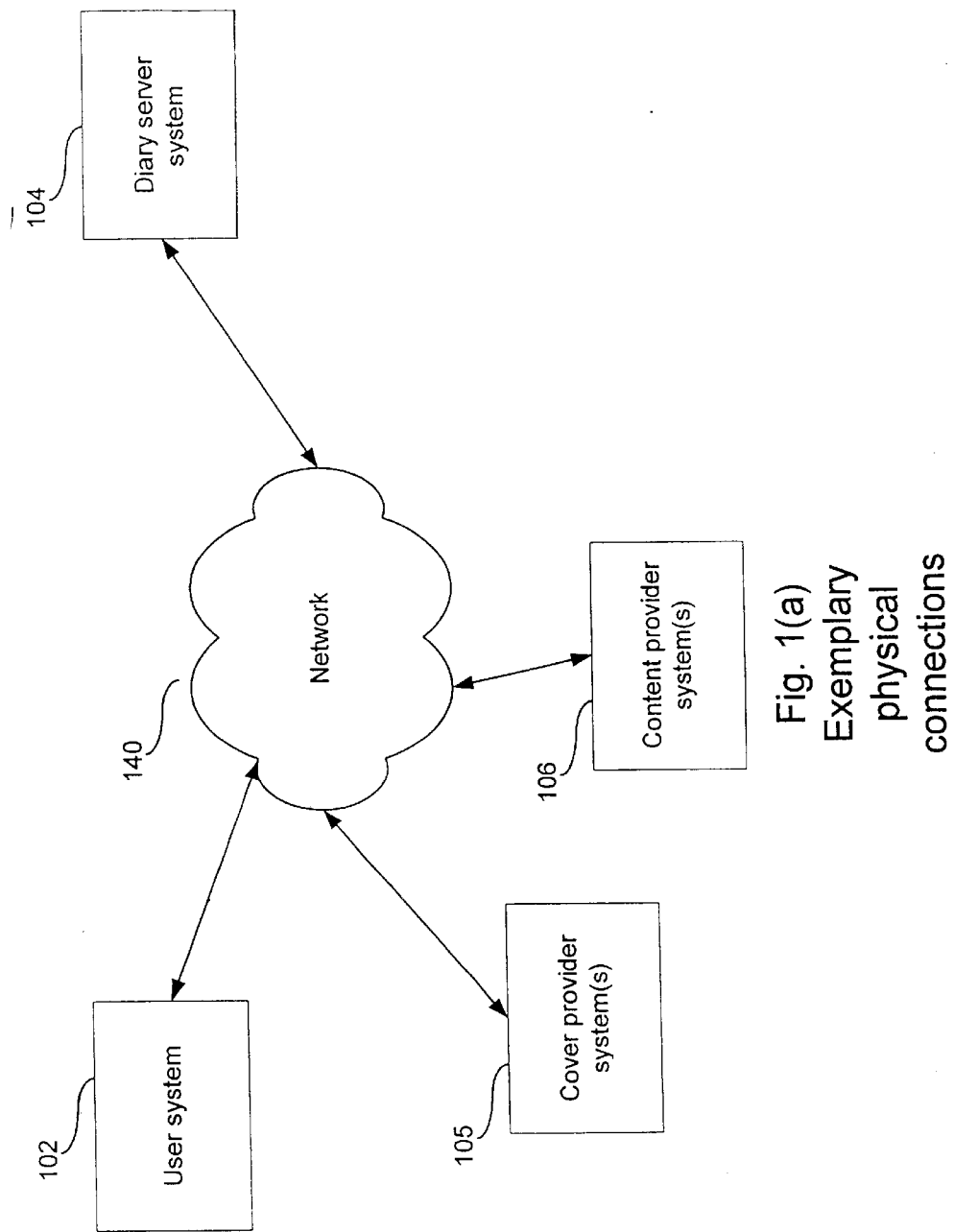
Fig. 1(a) Exemplary physical connections

An Exemplary Diary Implementation (shows logical connections)

An Exemplary Diary
Implementation (shows
logical connections)

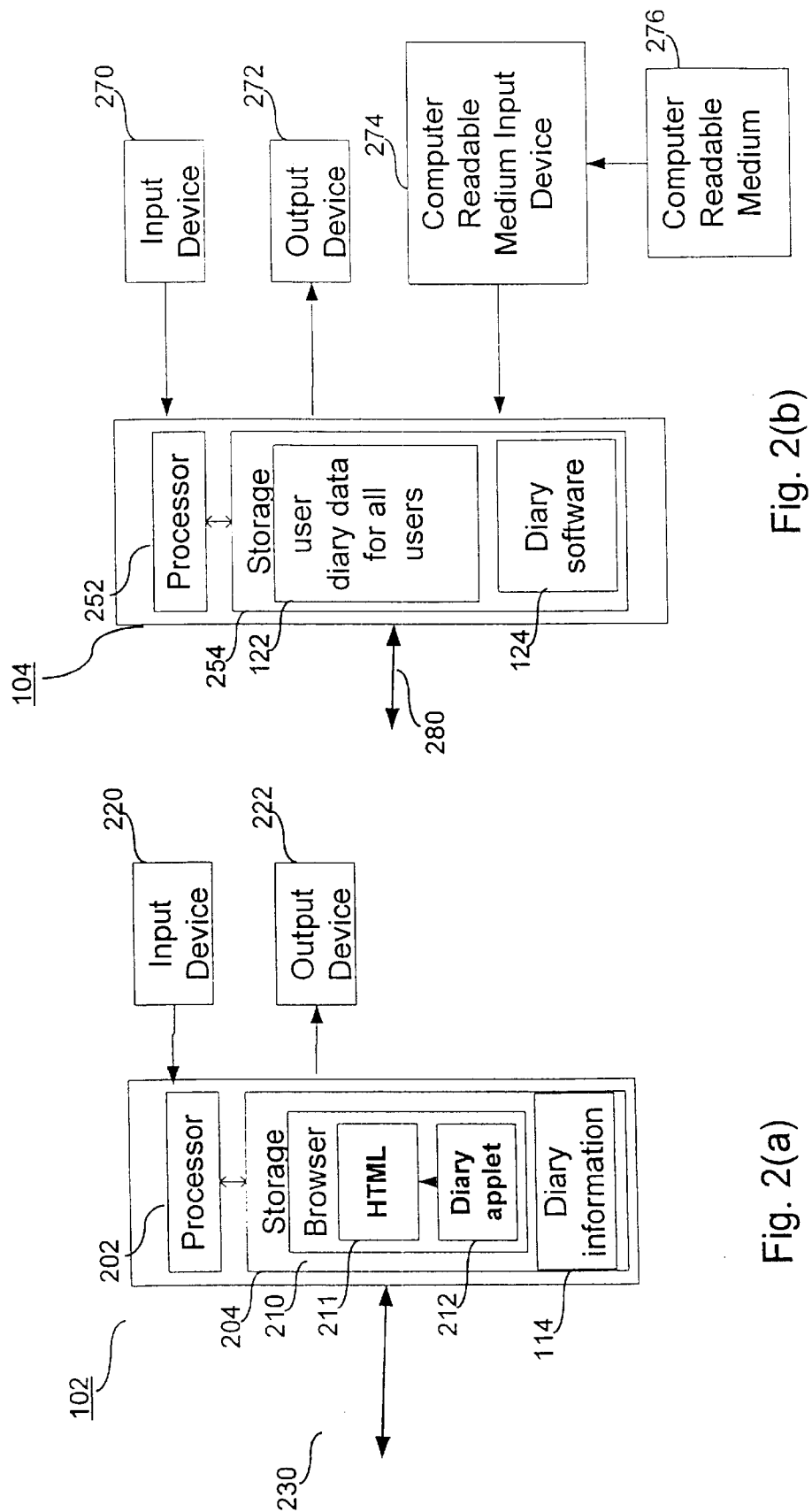

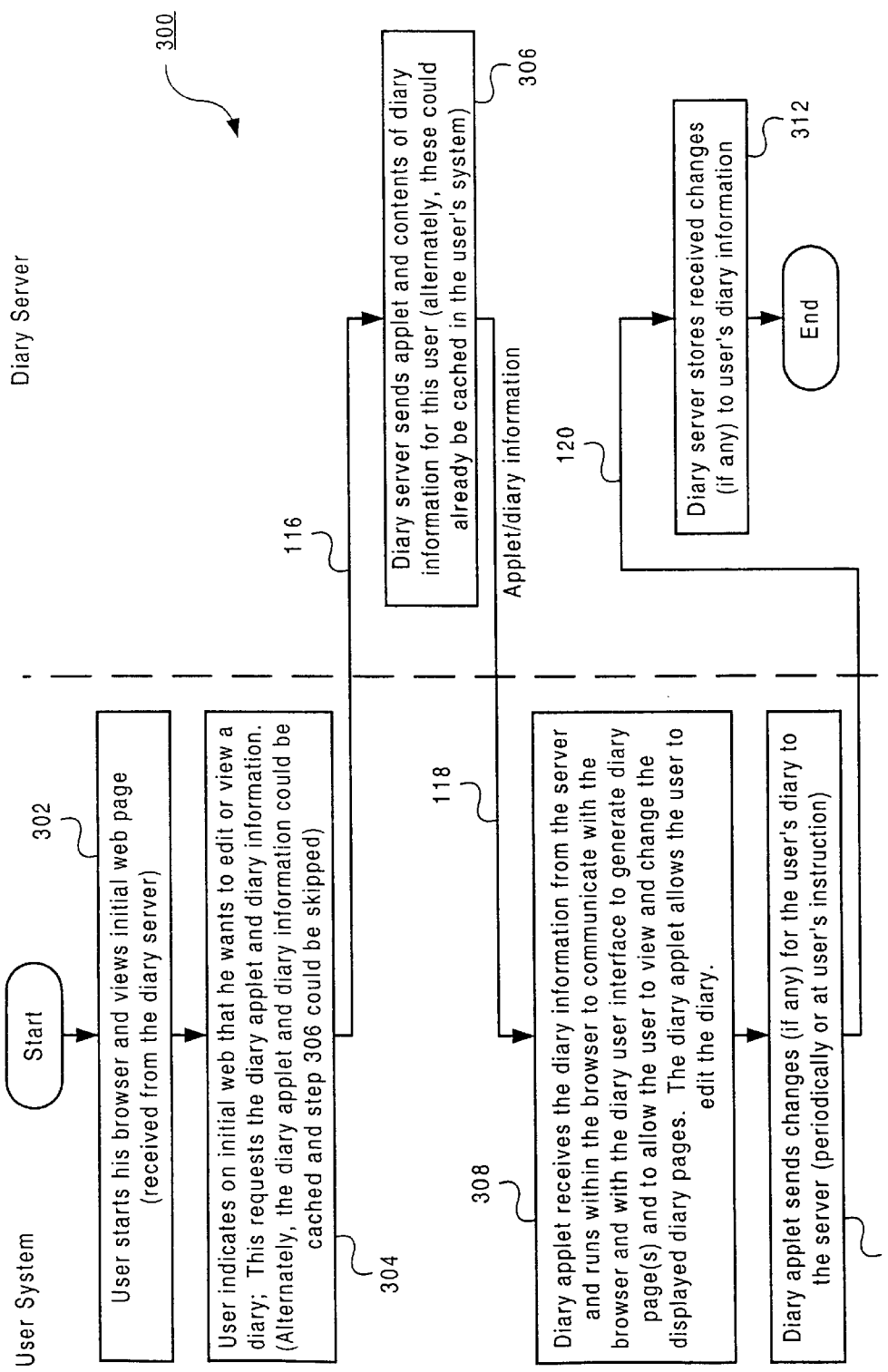
Figure 3 Viewing and Editing a Diary

Flowchart

The above operations are implemented through control by means of dynamic HTML generation. A flowchart is given below in figure 11.
- By setting the W3Diary in edit mode, the HTML generator re-generates the page and adds object control handles (in this case of type "edit") to the page
- The user clicks on a control handle. The handle identification is passed on to the HTML generation engine (by JavaScript in the current embodiment)
- Any appropriate action is executed on the object identified by the handle and represented in HTML
- Finally, a new (updated) page is generated and displayed.

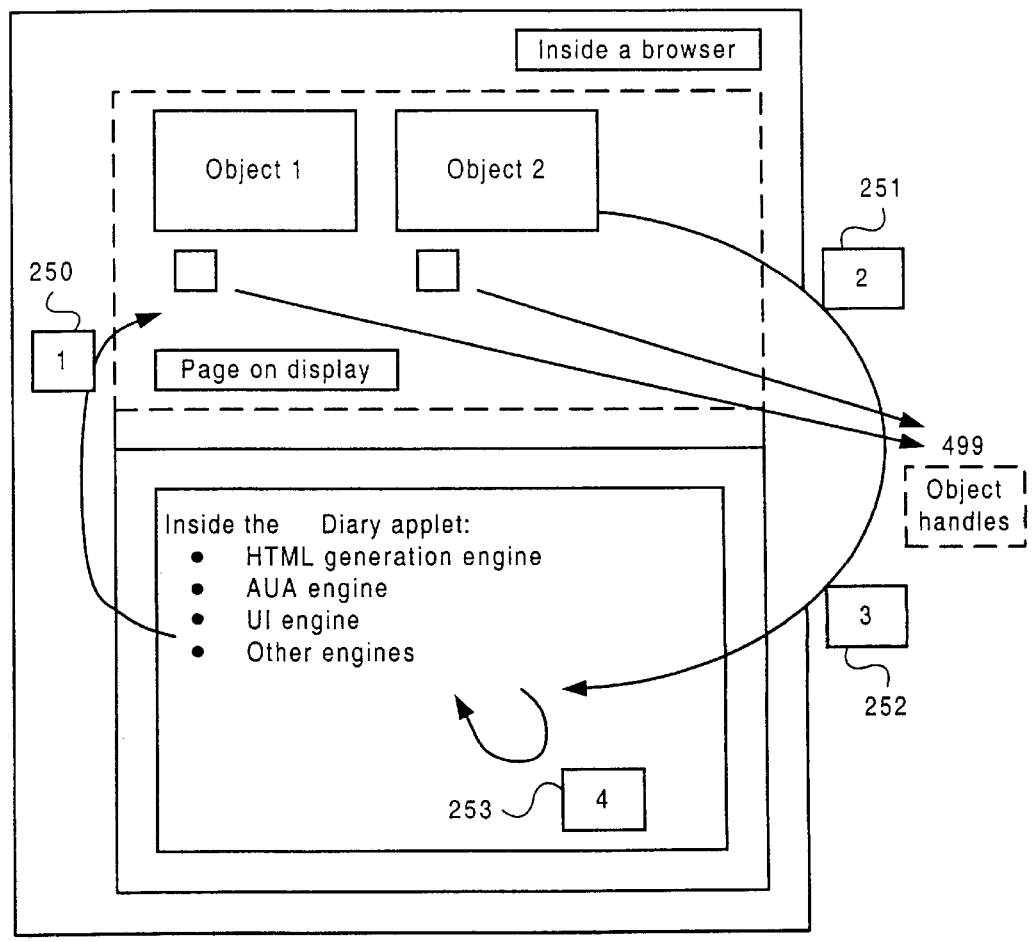

HTML Control (Editing content)

Figure 4(I)

Content Transfer

Window generated by transfer applet

Window generated by transfer applet

Cover-specific files:

These files are provided by cover designers.

| |
|---|
| • Diary specific HTML-files.<br>These files are shown in the browser at times the Diary is in some non-interactive state (e.g. while the Diary is starting up). |
| • Images.<br>A cover designer can provide images for the Diary user interface. For example, cover-specific graphics for the buttons in the user interface may be provided. |
| • HTML templates.<br>These files specify the layout of the Diary pages. |
| • Generator configuration file.<br>This file contains information for the generator about the mapping of templates to Diary pages. It is created using "Instant Cover", Diary's integrated cover design tool. |

Figure 9

User-specific files:

These files contain each W3Diary's user specific data:

| |
|---|
| • AUA-Database.<br>The content database contains the contents of a user's Diary. |
| • Config.<br>This file contains the user settings (see Config, above). |

Figure 10

AUA-Database

The Diary's content database contains the content a user has gathered. This content comes in many types, but since it should be viewable in an HTML-browser, the distinction between content types used by HTML will be adopted. HTML supports these four types of content:
- plain text
- images
- applets
- embedded objects Each content entry is shown on one specific Diary section, so the database stores the content on a per-section basis. As there are two kinds of sections (date sections and named sections), this structure is a little more refined.

The following diagram shows the structure of the content database:

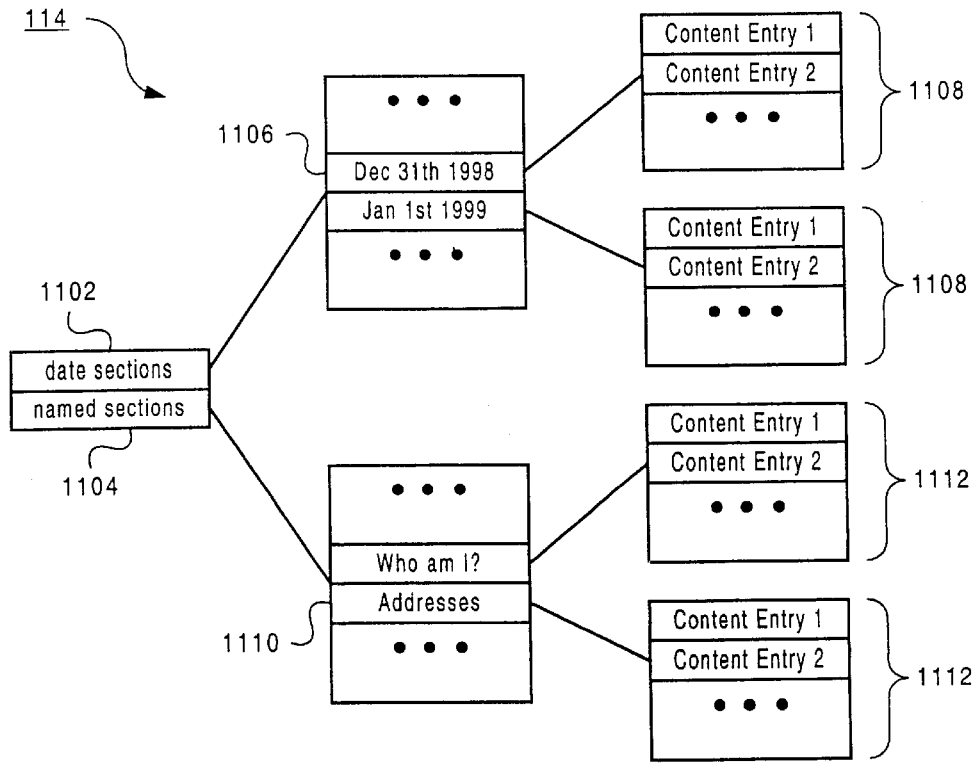

Figure 11

Template HTML-files

To specify the layout of the generated HTML-pages, the Generator uses HTML-templates.

Each HTML-templates uses the following Diary conventions that allow on-the-fly tailoring of the files:

1. Each image in the HTML-template named wifentry.gif is a placeholder for an entry; in W3Diary terms, each wifentry.gif represents a box.

1. The dimensions of the wifentry.gif in the original HTML-template will determine the bounding box of an entry.

2. The cover designer can indicate that the bounding box may be rotated by 90 degrees if that improves the fit.

2. Boxes must be inside an HTML table in order to allow correct generation of content surrounded by edit or provide images.

3. For pages in 'date' sections, each box should be accompanied by a time generator tag so that time information attached to a content entry can be visualized.

1. While viewing the template, each time generator tag should be close to its box.

2. In the HTML-file, the order of the list of the _TIME_ generator tags should be the same as the order of the list of the corresponding wifentry.gif's.
    Note: this results in HTML table designs in which the time generator tags are above (or below) each corresponding box. You *cannot* alternate the place (above/below) of the time generator tag with respect to its corresponding box. For, by doing that, the sequence of the time generator tags is not the same as the sequence of the boxes.

4. Optionally, include at any spot and in any context one or more of the following generator tags:

| Generator Tag | Substituted By | Example Value |
|---|---|---|
| _SECTION_ | the name of the section | Addresses |
| _DATESTRING_ | the date | March 13, 1998 |
| _YEAR_ | the year | 1998 |
| _MONTH_ | the month | 3 |
| _MONTHNAME_ | the month | March |
| _DAY_ | the day of the month | 13 |
| _WEEKDAY_ | the day of the week | Friday |
| _TIME12_ | the time of an entry in am/pm | 9:30 pm |
| _TIME24_ | the time of an entry, 24 hour based | 21:30 |
| _PAGE_ | the number of the current page within a section | 2 |
| _MAXPAGE_ | the total number of pages in a section | 5 |

Figure 12

Instant Cover

The individual template HTML-files are bound (like pages in a book). The "priority sequence" of these HTML-templates plus any other (meta-)information about those HTML-templates is stored in a file. This file is called w3diary.wif (WIF stands for "W3Diary Intermediate Format"). The Generator uses the WIF file to match templates to a W3Diary section.

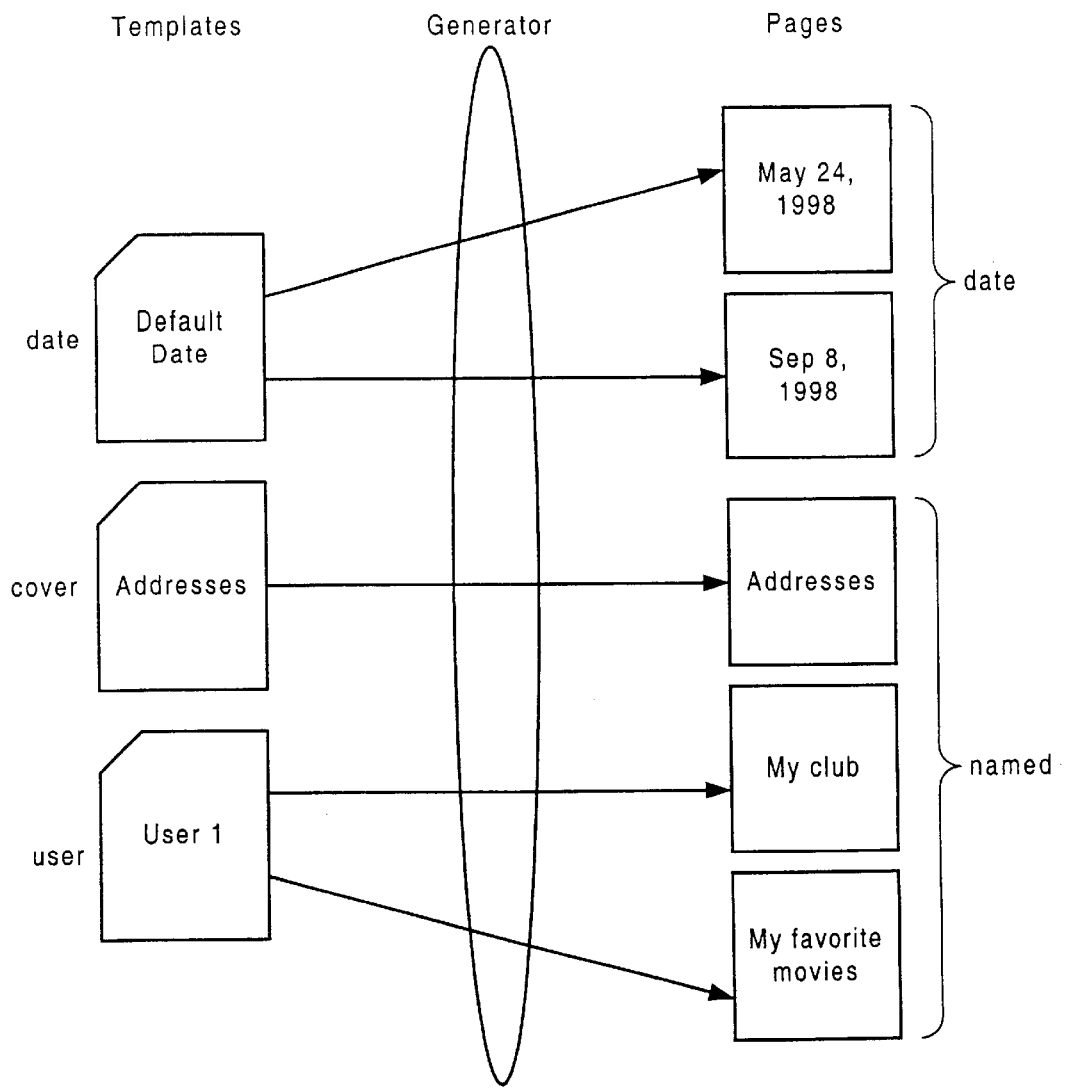

The WIF object is used to configure the Generator. The Generator consists of multiple ordered sets of Templates (which have their own variables) and of global variables. So the WIF object is just an efficient representation of the Generator.

Figure 13

METHOD AND APPARATUS FOR IMPLEMENTING A WEB PAGE DIARY

RELATED APPLICATIONS

This application is related to the following applications, filed concurrently herewith, each of which is incorporated herein in its entirety.

1. U.S. patent application Ser. No. 09/244,789, entitled "Method and Apparatus for HTML Control" by van der Meer.

2. U.S. patent application Ser. No. 09/144,717, entitled "System and Method for Generating, Transferring and Using an Annotated Universal Address" by van der Meer.

3. U.S. patent application Ser. No. 09/144,893, entitled "Method and Apparatus for Communicating With a Server" by van der Meer.

BACKGROUND OF THE INVENTION

The present invention relates generally to computer networks and, specifically, to a method and apparatus for implementing a "diary" of Web pages or the like on a computer network.

In recent times, the Internet has gained universal acceptance. A global network connecting millions of computers, the Internet is the current "ultimate" in information and communication technology. Still, it has quite a few drawbacks. Some drawbacks, such as its speed (or lack thereof) are readily apparent to the casual user. Other problems are not as obvious.

A first problem is the facelessness of the Internet. In real life, we (consciously or unconsciously) "judge a book by its cover," i.e., we form an opinion about other people based on how they present themselves, through their style of clothing, the car they drive, their hobbies and interests, and the people they admire or detest. Non-technical users of the Internet find it difficult to present themselves, other than what they say in newsgroups, etc. Technically-minded users have some ability to present themselves through their Websites. However, setting up and maintaining a Website requires more knowledge and effort than many users possess. To design a good personal Website a user needs to know about such areas as computer science, human-computer interface design, graphic design, fine art, and writing. It is obvious from many examples available on the Web today that not all users have all of these skills in equal proportions. As such, the Internet is essentially a faceless medium.

A second problem with the Internet is its volatility. While browsing the World Wide Web, users encounter huge amounts of information. In the real world, when we visit a place, we take home a tangible memory of the place, such as photographs or souvenirs. Web users do not have this option. Current mechanisms for saving references to Web pages (e.g., bookmarks and favorite lists) have the large drawback of being text-oriented and, therefore, provide no visual (or other) clue as to why the user originally thought the information was interesting enough to bookmark. The only memories a Web user has of the sites he has visited are some rather inexpressive bookmarks that say something like "Welcome to the homepage of SomeCompany" or "hftp:// www.somecompany.com/". Such bookmarks give no sensory clue as to why the user bookmarked the page in the first place. Thus, a user's travels on the Web are rather volatile, since he has nothing tangible by which to remember where he has gone. What is needed is a way for users to keep track of locations that they have visited in a more visual and memorable way.

SUMMARY OF THE INVENTION

The present invention allows a user to create a "diary" containing multimedia references to Websites. These references (also called "content objects" or "objects") can be addresses or URLs of, for example, text, bookmarks, images, programs, movies, etc. Many content objects are provided via the Websites of "content providers," with the specific intent of making the content objects available to a user to place in his diary. Other content objects can be copied from the diaries of other users. Still other content objects are entered by the diary owner himself.

The term "diary" arises because the invention preferably allows the diary owner to save these references in association with dates and/or times. Thus, at least part of the user's diary will likely organize information about Web pages (and other types of information specified by the diary owner) by dates. Other parts of a diary organize data according to type of data, having a diary page for such types of information as "recipes," telephone numbers, favorite Websites, etc. The pages of a user's diary may be navigated like a book, moving forward and backward through the pages or jumping to a particular page. In addition to storing references to Web information, the diary owner can also jot down reminders, enter appointments, and birthdays, etc. for dates.

A diary owner is allowed to choose a visual "theme" for the pages of his diary. This theme can be changed at any time by the diary owner and reflects how the diary owner wants to present himself and his diary to the world. A theme is reflected in a "cover" of a user's diary and in the design and general layout of the pages in the user's diary. These themes and covers are generally designed by professional graphics artists and provide an opportunity for revenue via the placement on the cover of ads or graphics associated with a particular company or product. In fact, the ultimate "ads" cover may be created when a single company creates a cover as an ad for itself. The company pays a licensing fee for the ability to provide a cover and for the right to be mentioned in a list of possible covers.

The diary owner can set various levels of privacy for different portions of his diary. Thus, certain portions of the diary (for example, a daily entry or a reminder list) can by viewed only be the diary owner, while other portions of the diary can be viewed by anyone with a Web browser. Thus, a diary owner may organize all or part of his diary to present an image of himself to the world.

The present invention allows "content providers" to place content ("souvenirs") on their Web page. Diary owners can then download a reference to the content into their personal diaries. When a user views the Web page of a content provider, he can choose to add one or more pieces of content offered on the Web page to his diary. A downloadable content object on a content provider Website has an associated executable program, such as a JavaScript, to aid in placing a reference to the content into the diary as discussed below in connection with FIGS. 5(a) and 5(b).

The diary owner can edit existing diary content and layout by entering an edit mode, which allows the owner to move and copy pieces of the content of a diary page, either within the page or to another page. A Diary applet regenerates the page to reflect the editing changes and passes it to the browser for display.

The Java execution environment implements certain security restrictions for Java applets. All Java parts of the diary embodiment are implemented as applets, so these security restrictions apply. Specifically, a Java applet that was loaded from server machine 104, onto user machine 102 to communicate with a different machine, such as content provider machine 106, can be problematic. Similarly, most Java execution environments do not allow Java applets to read, write, create, delete, or otherwise modify or examine the local file system. The first limitation raises problems when a diary owner wants to use content provided by a third party. Use of such content is described in detail in copending U.S. patent application Ser. No. 09/144,717, entitled "System and Method for Generating, Transferring and Using an Annotated Universal Address" by van der Meer.

The described embodiments of the present invention provide an implementation of the transfer function to save data from a third party provider between the diary applet (in the owner system) and the diary server (which stores diary data) that overcomes this restriction. While the three machines are typically separate, this method works even when one or more of the machines are the same. This transfer mechanism is not limited to diary applications and is usable in various other circumstances, such as whenever an executable program loaded from a first machine to a second machine needs to communicate with a third machine.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 1(*b*) is a block diagram of a computer network in accordance with an embodiment of the present invention, showing how a user's diary is viewed or edited.

FIG. 1(*c*) is a block diagram of a computer network in accordance with an embodiment of the present invention, showing how a content provider creates a diary cover.

FIG. 2(*a*) is a block diagram of a data processing system acting as a diary owner system.

FIG. 2(*b*) is a block diagram of a data processing system acting as a diary server.

FIG. 3 is a flow chart showing steps to view or edit a diary.

FIG. 4(*b*) shows an exemplary Sections window that allows the user to choose a named diary section to view.

FIG. 4(*c*) shows an exemplary Calendar Window that allows a user to select a dated diary section or to view.

FIG. 4(*d*) shows an exemplary Privacy window that allows an owner to set the privacy attributes of a diary section or content object.

FIG. 4(*e*) shows an exemplary Notes window that allows the diary owner to add notes to a link on a diary page.

FIG. 4(*f*) shows an exemplary Advanced window that allows a diary owner to perform various advanced editing functions on a diary page.

FIG. 4(*g*) shows an exemplary Add Entry window that allows a diary owner to add various types of content to a diary page.

FIG. 4(*h*) shows an exemplary window allowing a diary owner to add content of type image to a diary page.

FIG. 4(*i*) shows an exemplary window that allows the diary owner to manipulate existing content on a diary page.

FIG. 4(*j*) shows an exemplary diary page as displayed in edit mode.

FIG. 4(*k*) shows an exemplary copy/move window that allows a diary owner to copy or move content objects from and/or within their diary page.

FIG. 4(*l*) is a flow chart showing how an edit is performed on content during edit mode.

FIG. 4(*m*) shows an exemplary diary page after a content object has been moved, but while the page is still in edit mode.

FIG. 4(*n*) shows an exemplary diary page after a content object has been moved, and after an exit from edit mode.

FIG. 4(*o*) shows an exemplary diary page after a content object has been copied to another page and, and after an exit from edit mode.

FIG. 5(*b*) shows an overview of a second embodiment of a data transfer function involving three machines.

FIG. 6(*b*) shows an example of a window generated by an executable function during transfer of data between three machines, to prompt a diary owner for his name and diary server.

FIG. 7(*b*) shows an example of a window displayed during transfer of data between three machines.

FIG. 9 lists exemplary files provided by cover providers in a preferred embodiment of the present invention.

FIG. 10 lists exemplary files provided to generate the contents of diary pages in a preferred embodiment of the present invention.

FIG. 11 shows an exemplary format of an AUA-database of FIG. 10.

FIG. 12 shows exemplary cover HTML-files in a preferred embodiment of the present invention.

FIG. 13 shows a diagram of a relationship between various kinds of covers and the layout of pages generated by a diary applet.

DETAILED DESCRIPTION OF EMBODIMENTS

Figure 1B:
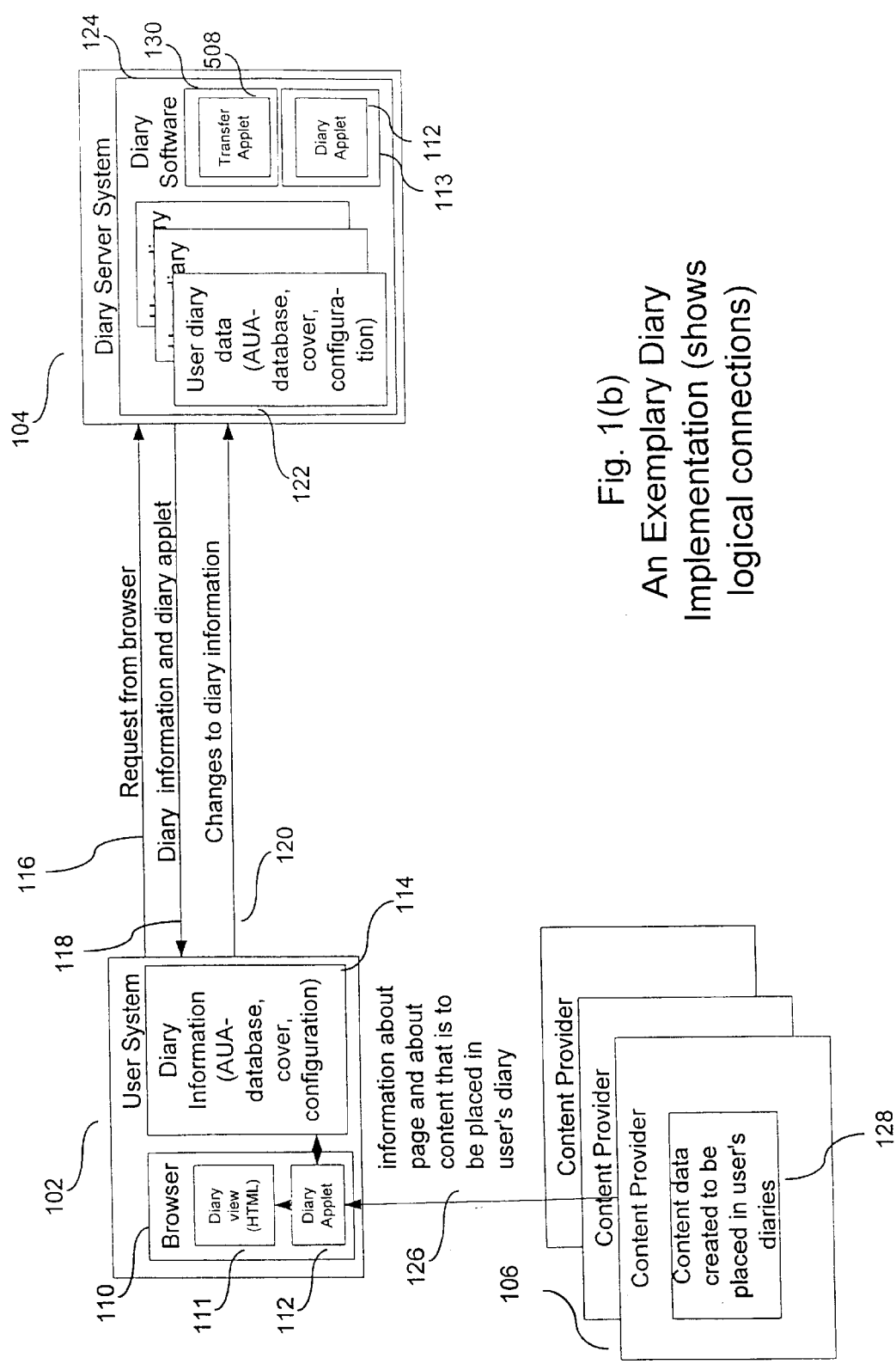
FIG. 1(*a*) is a block diagram showing exemplary physical connections between elements of a system in accordance with an embodiment of the present invention.

Reference will now be made in detail to several embodiments of the present invention, examples of which are illustrated in the accompanying drawings. Wherever practicable, the same reference numbers will be used throughout the drawings to refer to the same or like parts.

A. General Discussion

The present invention allows a diary owner to organize his information like a book. This information includes links to Websites and to content he has chosen to add to the diary. A diary includes one or more "sections." Each section contains one or more pages. The owner of the diary inserts "content objects" into sections of his diary. Some sections ("named section") have theme, such as "Recipes," "Telephone Number," or "Favorite Sites." All other sections ("dated sections") correspond to a date. Optionally, content objects may be organized by time. The described embodiment of the present invention handles time attached to content objects in a well-known and intuitive way. For example, it may sort these content objects by time and present them in the diary organization before content objects without time attached.

A diary has a book design. The book design determines the graphics and layout of content within pages of a diary. A book design includes page designs, and how page designs are mapped to actual pages of the diary. A page design may be unique to a section or repeated within a section or across sections. For example, the same page design may be applied to all Monday pages. The page design defines the visual and audible appearance of the page. A page design provides slots for content entries or objects. The page design determines the size and location of these slots within the page.

Diary owners insert content objects into pages. When a content object is inserted into a page, it is displayed in one of the slots provided by the page design of the page. A content object can be any type of object, including text, bookmarks, images, programs, movies, etc. The set of content objects inserted into the diary by the user is known as the "book content."

Unlike a traditional book, the book design and book content of a diary are independent. Both of the book design and the book content may be changed at any point in time. The owner of a diary can switch book design at any time. The designer of a book design may change the book's design at any time.

The diary software dynamically combines the diary's book design and book content to present a cohesive view of the 'book.' Furthermore, a single book content may have many different views, each with a different book design.

The described embodiments of the present invention are empowered by features that only an electronic book can offer. The electronic book can be stretched whenever required. The owner of the diary may add new sections to the book. The diary determines the number of pages in a section by the amount of content placed by the diary owner into the section. Whenever the number of pages of a section is insufficient to contain the amount of content in the section, the diary adds a new page to the section automatically. Similarly, the diary automatically deletes unused pages in a section.

Like other electronic books, the diary can be accessed through an electronic network. The diary can be read in concurrently by multiple users in different locations. Furthermore, different constituents of the diary may be stored or located in different locations within the network. For example, the book design, book content, parts of the book design, or content entries may be located in different locations within the network.

In the described embodiment, the diary may enforce privacy-rules on any part or level of the book, i.e., book, section, page, individual content entry. Other embodiments may implement other levels of privacy rules, and multiple implementations of this privacy concept are possible. In various implementations, privacy enforcement may be either advisory or mandatory. Different authentication and verification schemes may be employed to identify the user attempting to access the book. If a user does not have sufficient permission to view an object in a diary, the diary may not make the object visible to the user, i.e., the user does not even know that the object exists, or it may present the object using an alternate representation.

The diary has electronic search and navigational capability. The user of a diary may jump directly to any section/page of the book directly by electronic navigation through the book. The diary has dedicated search options to speed up access to content. For example, the user may have the option to jump to the most recent or nearest future section/page that contains at least one content entry.

The diary provides means to manipulate the contents in the book. A diary owner can provide permission to authorized users to insert content entries manually or by any other means, copy, delete, or move content entries. Content entries may be manipulated one at a time, or in larger groupings. For example, all the content entries within a section may be manipulated as a group, the content entries within a range of sections may be manipulated as a group, or all the content entries in the book may be manipulated as a whole.

Figure 1C:
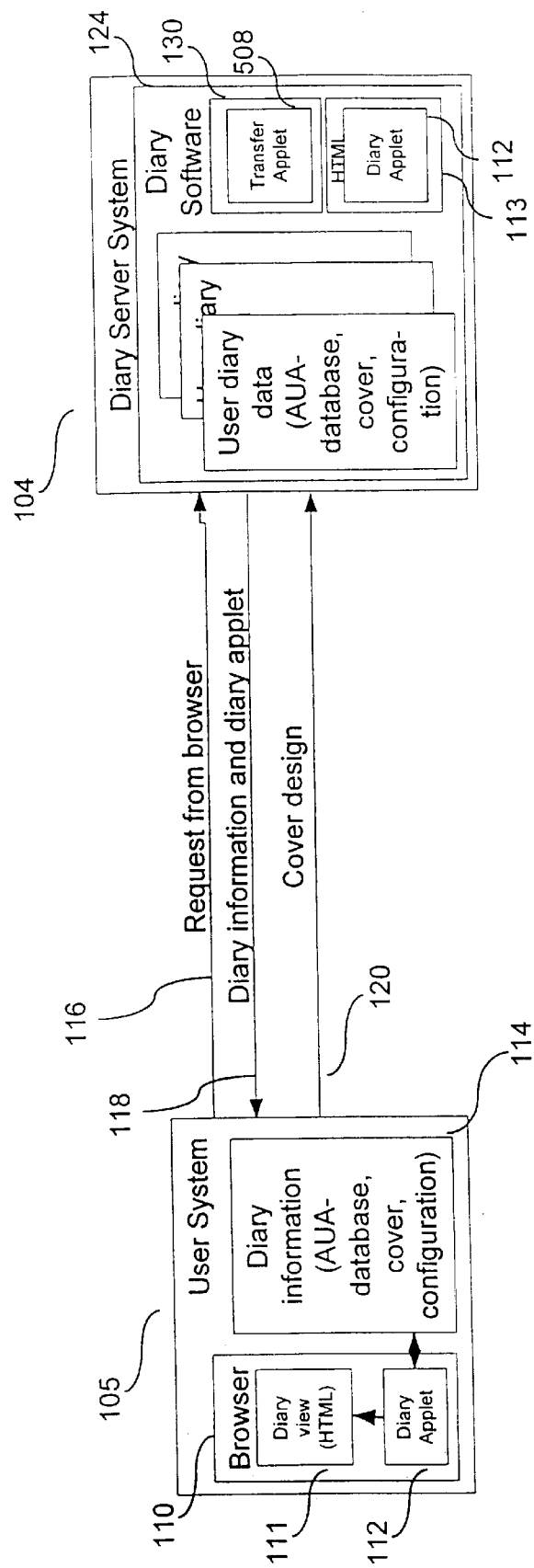

FIG. 1(*a*) shows a physical connection between four data processing systems: a user system 102, a diary server 104, a cover provider 105, and a content provider 106. It will be understood that, although only one of each kind of system is shown for clarity, there may be many user systems 102, many diary server systems 104, many cover provider systems 105, and many content provider systems 106. A user normally has one diary on one diary server, but a user can also have multiple diaries one or on multiple diary servers. Each of the data processing systems communicates with the others via a network 140. Network 140 can be the Internet, a WAN, a LAN, a wireless network, a cellular telephone network, a radio frequency network, or any other appropriate network or connection.

FIG. 1(*b*) is a block diagram of a computer network in accordance with an embodiment of the present invention, showing how a diary is edited or viewed. FIG. 1(*b*) includes user system 102, diary server 104, and one or more content providers 106. User system 102 can be the system of the owner of the diary or a system of some other person who wishes to view the diary. User system 102 includes a browser 110 (which is shown executing a diary applet downloaded from diary server 104) and diary information 114 containing information about the diary of this diary owner. One of the functions of diary applet 112 is to generate the HTML 111 for the Web pages of the user's diary (which preferably are displayed by browser 110 in the browser window) on output device 222 (see FIG. 2*b*).

Diary server 104 includes diary information 122 (which includes diary information for a plurality of users' diaries), diary software 124, and an original copy of diary applet 112, residing with the HTML or other description language 113 needed to display an initial Web page. Throughout this document, although the embodiment is described in connection with HTML (Hypertext Markup Language), it will be understood that the invention can be implemented using any appropriate descriptor language. Similarly, while the described embodiment uses a Java applet 112, any appropriate executable program can be used to implement the functionality of diary applet 112, including but not limited to JavaScript, ActiveX controls, Visual Basic, and plug-ins. In the described embodiment, a user begins viewing or editing a diary by viewing a Web page 113 available from the diary server. This Web page allows the user to indicate that he wishes to view or edit a specified diary. This indication begins execution of diary applet 112, which sends a request 116 to diary server 104 for the contents of the specified diary. When diary software 124 receives request 116 from browser 110, it sends information 118 appropriate for the specified diary to the user system. This information 118 includes diary information, an example of which is discussed below in connection with FIGS. 9 and 10.

Diary applet 112 reads diary information 114 received from the server and generates HTML 111 for one or more diary pages in accordance with diary information 114. Diary applet 112 instructs the browser 110 to display the diary page(s) in the browser window. In the described embodiment, diary applet 112 communicates with the user both through the browser window and via a user interface popped up by the applet (see, e.g., FIG. 4(*a*)). All direct interaction (i.e., all interaction that is not done via the browser window) of the diary applet with the user is by windows that are popped up by diary applet 112.

It will be understood that all or part of a person's diary can be viewed either by the owner of the diary or by other people, depending on how the owner sets privacy values associated with the diary. In fact, a person's diary pages can, in general be viewed by any person having access to a browser. The browser can be a standard Web browser, such as Navigator, available from Netscape Corp. and Explorer, available from Microsoft Corp. and does not need to be modified to allow a user to view an existing diary.

FIG. 1(*c*) is a block diagram of a computer network in accordance with an embodiment of the present invention, showing how a content provider creates a diary cover using a cover provider system 105. The cover provider can be, for example, an entity who has paid a fee to be allowed to create diary covers that diary owners can use in their diaries. It is anticipated that cover providers will add advertisements, product placements, or the like to their covers, but this is not required. A cover provider executes an enhanced version of diary applet 112.

FIG. 2(*a*) is a block diagram of a data processing system acting as a user system 102. FIG. 2(*b*) is a block diagram of a data processing system acting as a diary server 104. Data processing systems 102, 104 include processors 202, 252 and storage areas (such as memories) 204, 254. Storage area 204 in user system 102 includes a browser 210 and diary information 114. Browser 210 can be any appropriate browser, including but not limited to Navigator and Explorer. Storage 254 in diary server 104 includes diary information 122 for all users and diary software 124 for communicating with applet 112.

Systems 102, 104 also include an input device 220, 270 such as a mouse, a keyboard, a touch screen, or any other appropriate device. Systems 102, 104 also include an output or display device such as a display screen, monitor, or any other appropriate device. Certain implementations of the invention include sound capability. Both system 102, 104 connect to a network such as the Internet or any other appropriate network via a connection 230, 280.

In certain embodiments, diary server 104 includes a computer readable medium input device 274, which is capable of reading a computer readable medium 276. A person of ordinary skill in the art will understand that the systems of FIGS. 2(*a*) and 2(*b*) may also contain additional elements, such as input/output lines; additional input devices and additional display devices. The systems of FIGS. 2(*a*) and 2(*b*) also may include application programs, operating systems, data, etc., which are not shown in the figure for the sake of clarity. It also will be understood that the systems of FIGS. 2(*a*) and 2(*b*) can also include numerous elements not shown, such as disk drives, keyboards, display devices, network connections, additional memory, additional CPUs, additional processors, LANs, input/output lines, etc.

In the following discussion, it will be understood that the steps of methods and flow charts discussed below preferably are performed by one of processors 202, 252 (or other appropriate processor or processors) executing instructions stored in storage areas 204, 254 (or other appropriate storage areas). Specifically, the steps of the embodiment described herein are performed by diary applet 112 when it executes in browser 100 (and by other executable programs within the browser as described below) and by diary software 124. It will also be understood that the invention is not limited to any particular implementation or programming technique and that the invention may be implemented using any appropriate techniques for implementing the functionality described herein. The invention is not limited to any particular programming language, operating system, or network protocol.

Some or all of the instructions and data structures in storage areas 254 may be read into memory from computer-readable media 276. Execution of sequences of instructions contained in the storage areas causes processors 202 or 252 to perform the process steps described herein.

In alternative embodiments, hard-wired circuitry may be used in place of or in combination with software instructions to implement the invention. Thus, preferred embodiments of the invention are not limited to any specific combination of hardware circuitry and software. The instructions performed by the processors can also be transmitted over a carrier wave in a computer network such as the Internet an intranet, a LAN, a WAN, and so on.

B. Overview of Viewing and/or Editing a Diary

FIG. 3 is a flow chart 300 showing steps to view or edit a diary. In general, steps of the left side of the figures are performed by diary applet 112 executing in a browser of user system 102, while steps on the right side of the figure are performed by diary software 124 executing in diary server system 104. In step 302, the user starts his browser 110 and views an initial diary Web page (not shown) received by the browser in a manner known to persons of ordinary skill in the art. This diary Web page allows new diary owners to register and to pick initial covers for their diaries (not shown), while allowing existing diary owners to decide to view and/or edit their diaries and allowing any person to view the non-private diaries of others. In step 304, the user indicates that he wishes to view or edit a diary, diary applet 112 is obtained from system 104 and executed within browser 110 and the remainder of steps of FIG. 3 are performed.

In step 304, diary applet 112 sends the request for diary information to diary server system 104, where, in step 306, diary server system 104 sends diary data 122 for the specified diary to applet 112. In a preferred embodiment of the invention, this diary data is transferred as a ASCII document, and not via the browser, although any appropriate format could be used. As will be understood by persons of ordinary skill in the art, the applet and diary data could also already be stored in a cache of the system 102 and, therefore, it would not be necessary to transfer data from the server. This cache is not necessarily the browser cache. Diary applet 112 receives diary data for the user and stores it in diary information 114. In the described embodiment, diary information stores three basic types of data: an AUA-database specifying the content of the diary page(s) that was gathered or created by the user; a cover (also called a "presentation context") for the diary, and configuration information for the user. An AUA is an "Annotated Universal Address," as described in U.S. patent application Ser. No. 09/144,717, entitled "System and Method for Generating, Transferring and Using an Annotated Universal Address" by van der Meer. The AUA-database is user-specific. The cover is shared by all users that have selected the same cover. The configuration information, such as privacy level, passwords, or the full name of the user, is user-specific. A fourth part (a backup AUA-database, not shown) can be created on the fly and is used to "go back" to previous diary content.

In step 308, diary applet 112 generates one or more pages of the diary in HTML in accordance with the cover, content, and configuration information. The HTML is displayed as a diary page by browser 110. After generating a first page of the diary, diary applet 112 displays a navigator bar or some other appropriate user interface, such as that shown in FIG. 4(a), and thereafter reacts to the actions of the user to view or change the diary, as described below. In step 310 diary applet 112 sends changes (if any) for the user's diary to the diary server (periodically or at user's instruction).

C. Navigation by a user Within a Diary

The following section provides examples of the various functions of the diary navigation mechanism used in the described embodiment. It will be understood that the specific buttons and functionality described are provided by way of example and not of limitation. Other buttons and other functionality can be added to and certain buttons and functionality can be omitted from the invention without departing from the spirit of the present invention.

1. The Navigation Bar

Figure 4A:
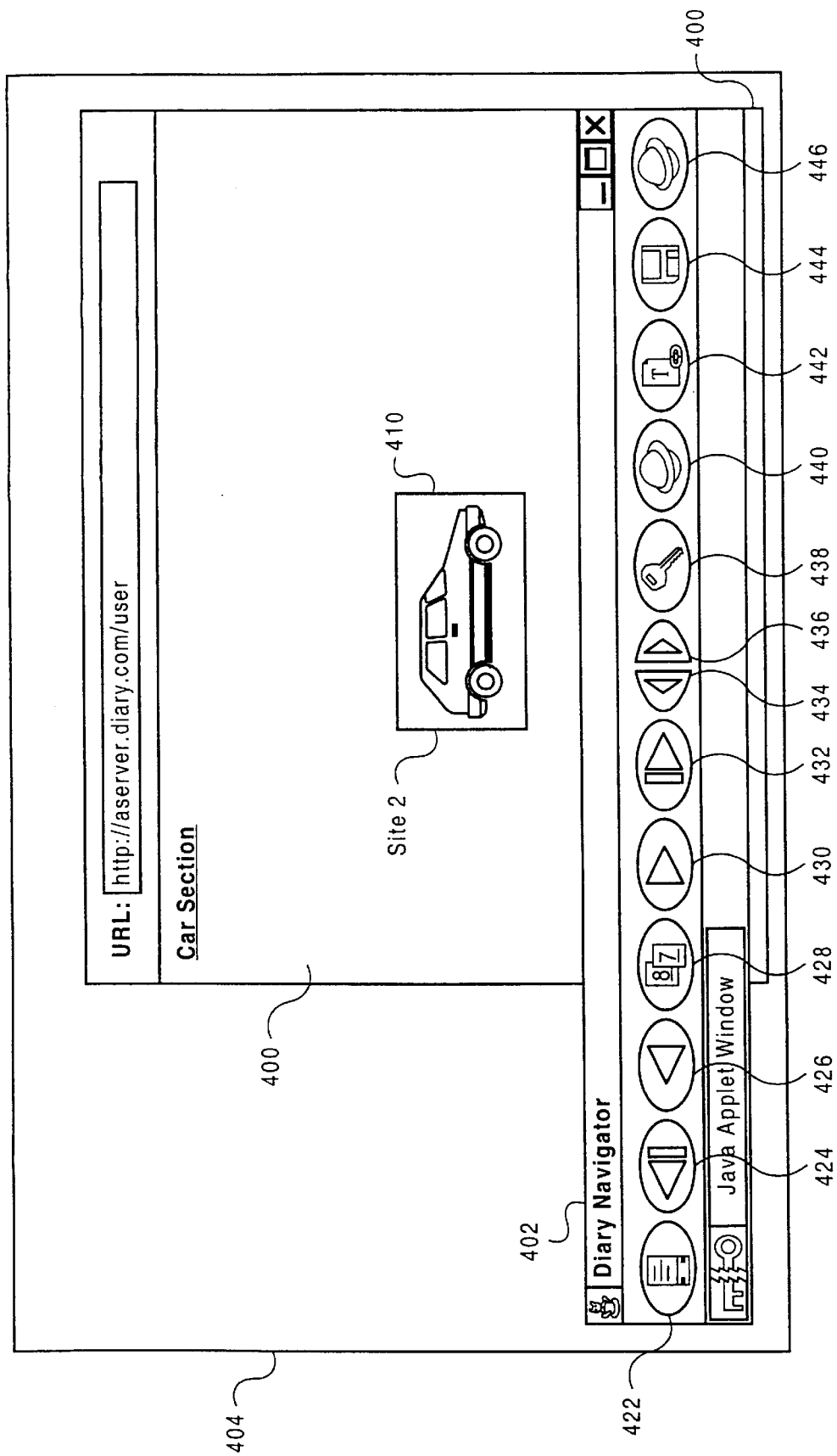
FIG. 4(*a*) shows an exemplary Web page being viewed with a browser, and also shows a diary navigator bar.

In FIG. 4(a), exemplary diary page 400 is being viewed with browser 110, and diary applet 112 has popped up a diary navigator bar window 402. In the Figure, both diary page 400 and navigator bar 402 are displayed on a display screen 404. As discussed above, diary page 400 was generated by diary applet 112 in accordance with diary information 114 for the diary page 400, which was previously created by an owner of the diary. As can be seen, diary page 400 is a named page entitled "Car Section" and is dedicated to information added by the diary owner about cars. In the figure, the diary owner has previously added one image of a car 410 to the diary page. Dated pages look similar to named pages, except that the date appears on the page (e.g., at the top) and is associated with the page in the diary information 114.

As shown in FIG. 4(a), navigator bar 402 includes buttons 422, 424, 426, 428, 430, 432, 434, 436, 438, 440, 442, 444, and 446. The first eight buttons are used to allow the user to move around within the pages and sections of a diary. Thus, button 422 represents a "Sections" function that allows the user to view named sections of the diary. Buttons 424, 432 allow the user to display a first of last section that contains at least one content object. "First" and "Last" are to be interpreted relative to the section currently showing. Buttons 426 and 430 allow the user to display the immediately previous or next section. "Previous" and "next" are to be interpreted relative to the section currently showing. For dated sections, the previous section is the section that corresponds to the date before the date currently showing. Next corresponds to the date after the date currently showing. Button 428 allows the user to display a diary page or section for a specific date. Each section, dated or not, can have multiple pages within the section. Buttons 434 and 436 allow the user to display next or previous diary pages for a section. Button 438 allows a user to change the privacy level on which the diary is operating, provided that the user is able to authenticate himself at the desired level. Buttons 440, 442, 444, and 446 are only available when the diary is operated at the "owner" privacy level. Button 440 will pop-up a new window containing the advanced diary operations such as, e.g., moving or copying objects from one section to another. Button 442 allows a user to create a "text" object to be placed in the current section. The final two buttons 444, 446 provide access to a backup function and an edit property function. Button 446 is only present if the user who is running the diary applet is also registered as a cover builder. Button 446 allows the user to change the properties of the diary itself.

Figure 4B:
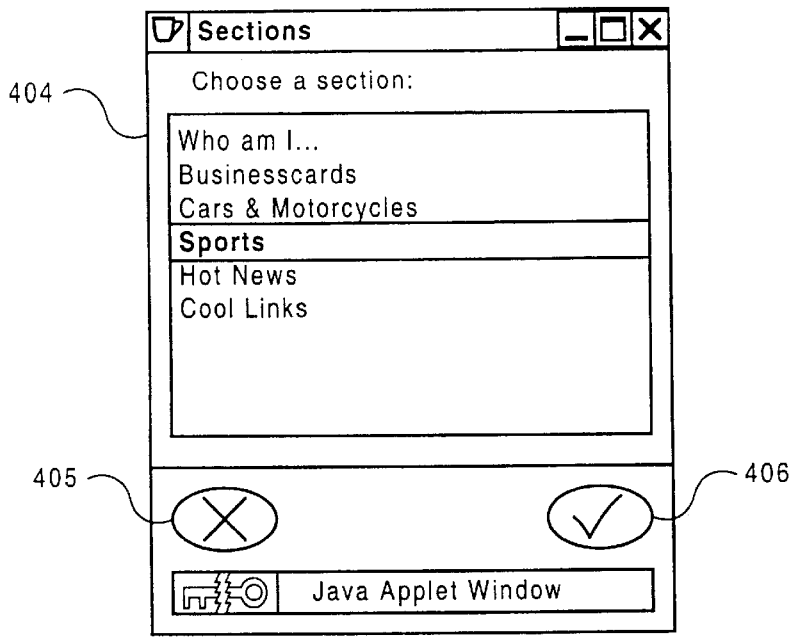

FIG. 4(b) shows a Sections window that allows the user to move between named sections in the diary. The user is presented with a list of existing named sections. Diary applet 112 reads the user's selection and generates HTML for the selected section in accordance with diary information 114. In the window of FIG. 4(b) and others of the windows mentioned below, the user can click cancel 405 or accept 406 to cancel or accept any changes he has made.

Figure 4C:
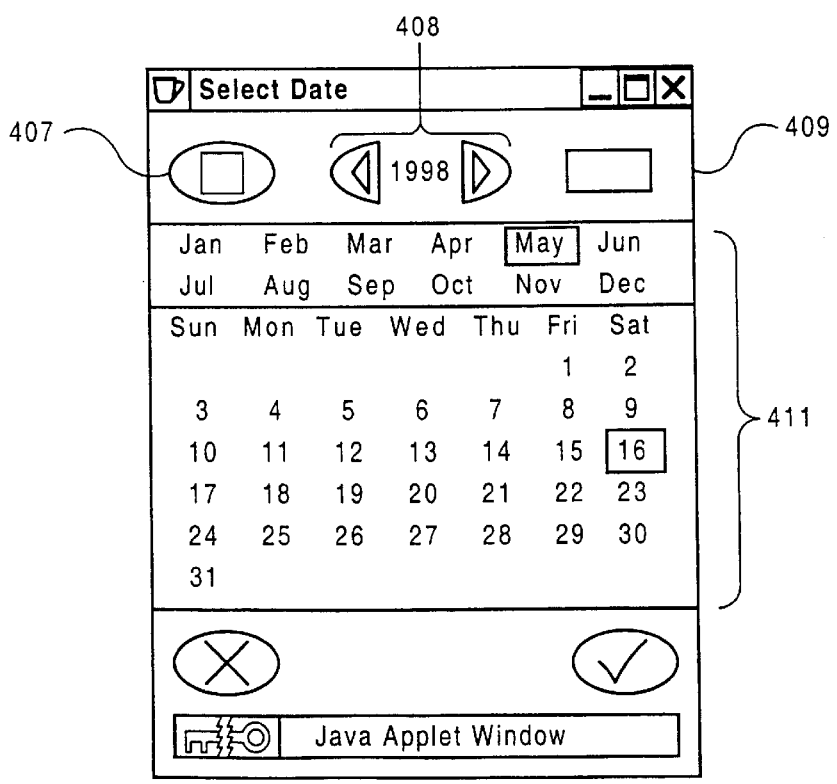

FIG. 4(c) shows a calendar window that allows the user to move between dated sections in the diary. The user is presented with a calendar input that allows him to view a diary page for a given month, day, and year. Icon 407 is a shortcut. It indicates that the diary page for "today" should be displayed. Buttons 408 allow the user to increment or decrement a current year. Area 409 allows the user to enter a year, which may be more efficient than incrementing or decrementing under certain circumstances. Diary applet 112 reads the user's selection and generates HTML for the selected page or section in accordance with diary information 114.

2. Privacy Level of a Diary Page

Button 438 allows any user to change the privacy level on which the diary is operating, provided that the user is able to authenticate himself at the desired level. Authentication is preferably performed by requiring the user to enter a password required to change the privacy level to a certain level. In the described embodiment, clicking or otherwise selecting this button displays window 450 of FIG. 4(d).

Figure 4D:
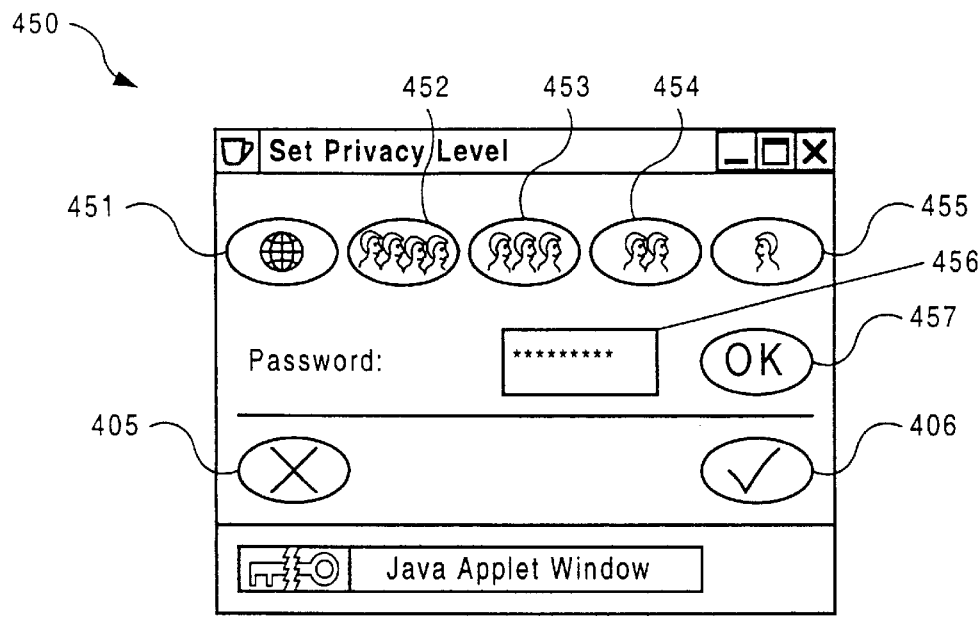

FIG. 4(d) shows a window 450 or similar navigational element for the privacy function of button 438. Window 450 allows a user of the diary to set a privacy level at which the diary is operating of: world, friend, close friend, best friend, and owner via respective buttons 451, 452, 453, 454, and 455. Any user can change the privacy level, provided that he is able to authenticate himself, e.g., via a password supplied in area 456. This window determines which sections and which objects will be visible during browsing through the diary. If the user selects the owner privacy level (button 455) and can supply a correct password in area 457, after clicking OK button 456, buttons 440, 442, 444, and 446 of FIG. 4(a) become available to the owner. Otherwise these buttons are grayed out. Use of button 440 will pop-up a new window containing the advanced diary operations such as, e.g., moving or copying objects from one section to another. The passwords for a particular user's diary pages are stored as configuration information in that user's diary information 114.

3. Adding a Note on a Diary Page

Figure 4E:
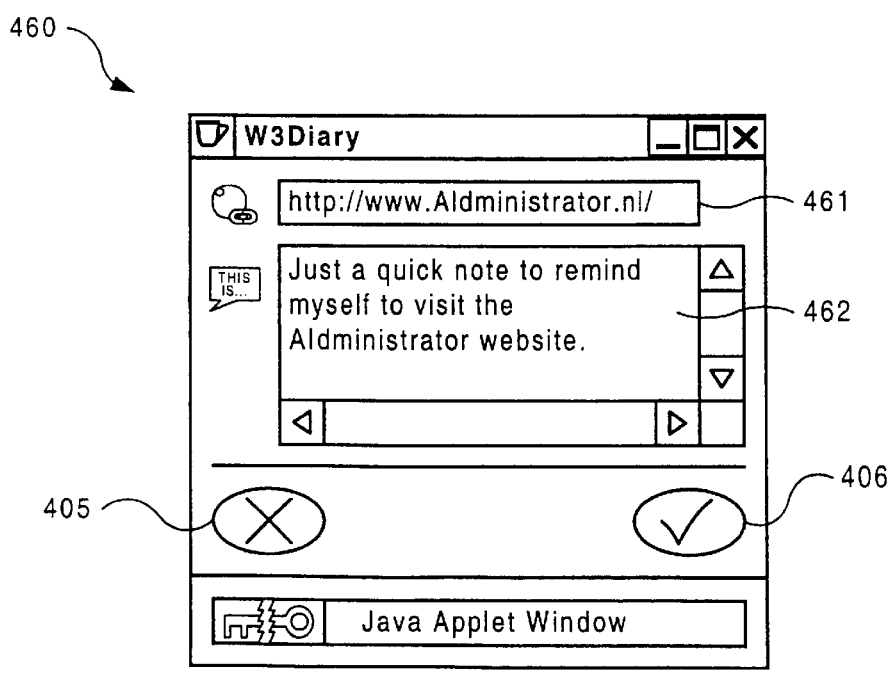
Figure 4F:
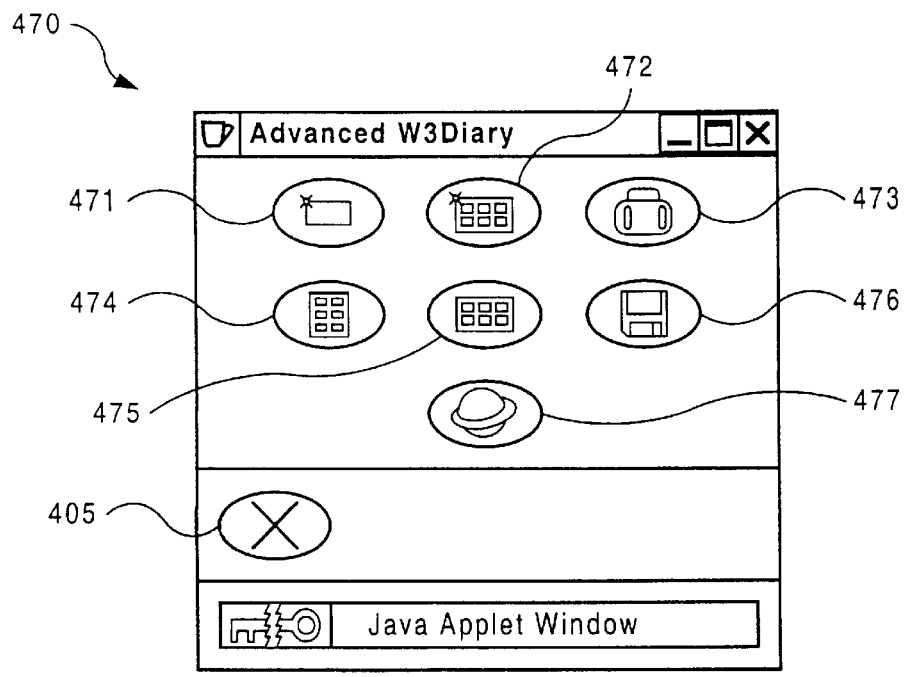
Figure 4G:
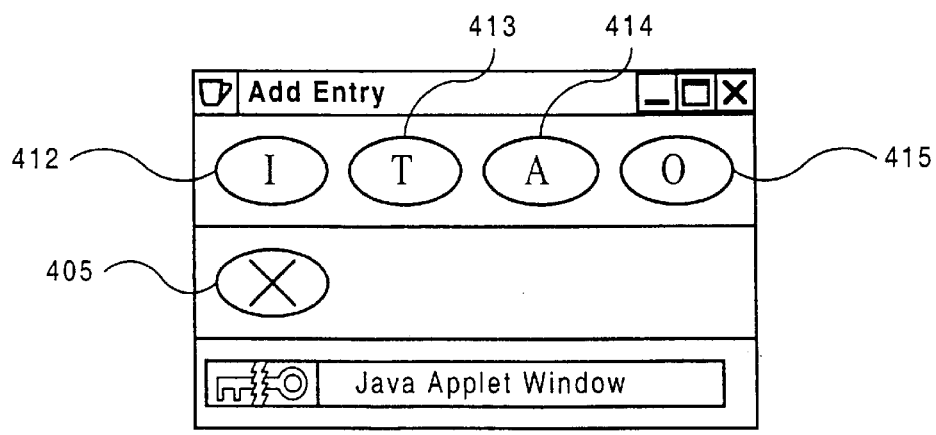
Figure 4H:
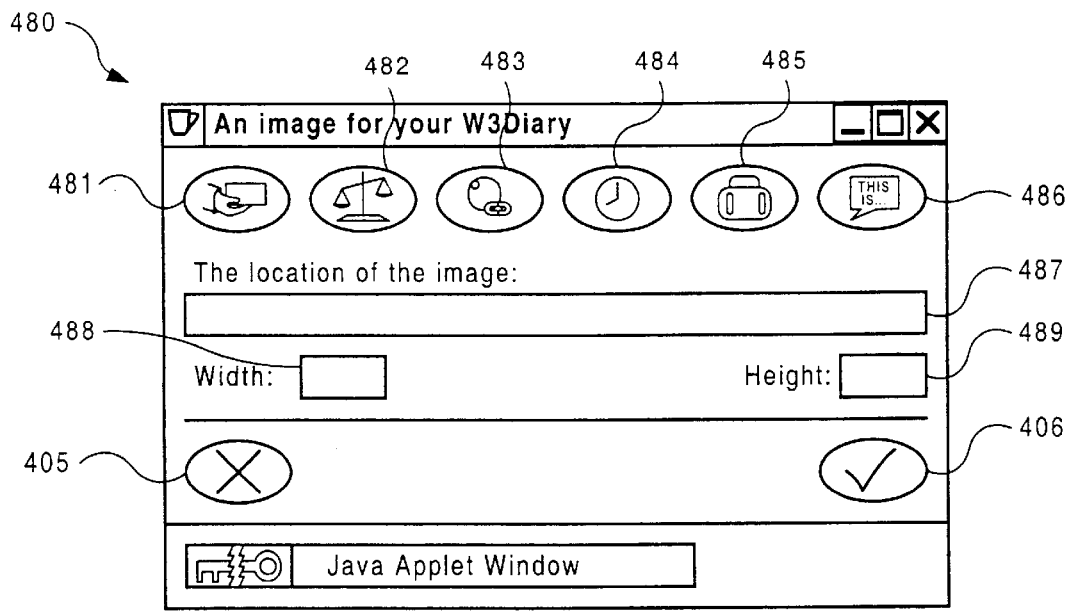

Button 442 provides a way for the owner to make quick notes with an optional associated link in the diary. FIG. 4(e) shows a window 460 or similar navigational element for the note function of button 442. Window 460 includes an area 461 in which a diary owner can enter an address (such as a URL) of a link in the diary. The window also includes an area 462 where the diary owner can enter his text. After the diary owner enters a link address and some text, applet 112 adds the entered text to the diary information in association with the entered link on the page. When the diary page is viewed, the note (with the link attached to the note) will be displayed as part of the diary page.

4. Store Function

Store button 444 stores the AUA-database, the configuration, and the backup AUA-database if and only if these three parts of the diary information have been created (only in case of the backup AUA-database) or changed. Button 444 is enabled by diary applet 112 when something in the diary has been changed. In the described embodiment, the diary also saves the diary information when the user instructs the browser to load a Website different from the diary server. This will cause the browser to unload the diary, which automatically starts the save option.

5. Advanced Functions

Button 446 provides access to certain advanced functionality as described below. FIG. 4(*f*) shows a window 470 or similar navigational element for the advanced function of button 440. Window 470 includes four upper left-hand buttons 471, 472, 474, 475, which allow the diary owner to modify his AUA-database. With these buttons an owner can add a content entry (button 471), add a section (button 472), change passwords for privacy levels (button 473), put diary in edit mode (button 474), edit section properties (button 475), and make/load backup (button 476). Button 477 is a special button available only to content providers.

Button 473 allows the owner to change passwords for the five privacy levels that are shown in FIG. 4(*d*). All users must enter an appropriate password before diary applet 112 will generate HTML (for content objects) or otherwise reveal the existence of objects having those privacy levels (e.g., for named sections in the named section list 404). Button 476 allows the user to backup/load the diary contents. Button 477 is only present if the user who is running the diary applet is also registered as a content provider. Button 477 allows a content provider to change an existing "standalone" HTML file in such a way that it will, after the change, provide content for any user to include in his diary. If the diary owner adds a section to his diary via button 472 (or changes a section via button 475), the diary owner only needs to specify the name of the section (window not shown). Diary applet 112 will add a section to the user's diary having the specified section name using the default cover for the diary.

i. Adding Content Entries

FIG. 4(*g*) shows a window or similar navigational element for the add content button 471 of FIG. 4(*f*). This window allows an owner to add his own content entries to his diary. The diary owner selects a type of: image 412, text 413, applet 414, or embedded object 415. Depending on which type of content the diary owner is adding, an appropriate window, such as the window in FIG. 4(*h*) is displayed.

FIG. 4(*h*) shows a window 480 or similar navigational element to allow the diary owner to add his own image entries to his diary. This requires specifying the address (such as a URL) of the image (in area 487), as well as the real width and height of the image in areas 488 and 489. The buttons on the top row are used to specify whether or not to provide the image to other diary owners, i.e., whether other diary owners can copy the content from a diary into their own diary (button 481), to set a weight (button 482), to set a time button 484, to set a privacy level for the image (button 485), and to provide a textual description of the image in the diary (button 486). Image weights are used, for example, when a series of images are available. Each image in the series is assigned a weight so that applet 112 can order the images if needed. Time button 484 associates a time (such as a creation date or a date in history) with the image. Here, the date associated with the object is implicit, since the object is part of a dated section, but in a named section an object can have an associated time. Under certain circumstances, applet 112 will generate a diary page having the images of the page in time-sorted order. Diary applet 112 will add an image to the current section (that is, the entry just created). Although not shown in the figures, similar windows exist to allow the diary owner to add content of types text, applet, and embedded object to a diary page. An embedded object is the HTML term for an "external" object type, such as a Quick-Time movie, RealAudio, RealVideo, etc.

ii. Modifying Content Entries

Button 474 of FIG. 4(*f*) causes applet 112 to display an edit mode window 490 as shown in FIG. 4(*i*), which enables a diary owner to modify content entries that are already in the diary. As shown in FIG. 4(*j*), in this mode, entries in a diary page are generated by diary applet 112 to have a clickable border 499 or some similar indicator (which can be cover specific). Clicking this border 499 brings up the window 490 shown in FIG. 4(*i*). Window 490 offers an owner the ability to modify the position of the entry in the section: move to top position; move one position up; move one position down; move to bottom position (buttons 491, 492, 493, and 494), and the ability to copy, move, or delete the selected entry (button 495). The diary owner can change properties of a content object on a diary page via button 496, which opens a window (not shown) similar to that which is used to add an entry (see FIG. 4(*h*)), with at least one difference.

Content entries that are provided by third parties are not modifiable. Because a content provider has invested time, money, and/or energy in the creation of a diary object, and because content providers should be encouraged to continue to supply content, users are not allowed to change any aspect of an object that was provided by a third party. This will prevent undesirable user actions such as changing the link associated with an image of CompanyA (that originally pointed to some spot in the Website of CompanyA) to point to some spot in the Website of companyA's biggest competitor. Only the time, privacy level, and description can be changed by the diary owner. Note that the time, privacy level, and description were the entries added by the diary owner himself (as opposed to transferred from a content provider Web page).

FIG. 4(*l*) is a flow chart showing steps involved in editing an existing content object. In step 250, once diary applet 112 determines that the page is in edit mode, applet 112 regenerates the page to add an object control "handle"499 to each content object on the diary page (see FIG. 4(*j*)). In step 251, when the diary owner clicks on a control handle, the browser initiates executable program code (e.g., Java or JavaScript) that has been generated by applet 112 and added to the HTML edit-mode page being displayed. When the diary owner clicks on the handle 499, the browser executes this program code in a manner known to persons of ordinary skill in the art. The program code then communicates with applet 112 to tell it which content object has been selected for manipulation. Applet 112 then displays appropriate windows (see, for example, FIG. 4(*f*) and 4(*k*)) to allow the diary owner to manipulate the selected content object). Diary applet 112 executes appropriate action(s) on the selected content object identified by the handle 499. In step 253, diary applet 112 regenerates the HTML for the diary page to reflect the edit, after which the HTML is displayed by browser 110.

The reason that diary applet 112 must generate an executable program associated with each handle is that there is no other way for applet 112 to learn when the diary owner has clicked on a handle 499. The HTML for a diary page is actually displayed by browser 110, and the browser would not otherwise notify applet 112 of a handle click. The method of FIG. 4(l) enables embodiments such as a diary to display and manipulate contents within an HTML document and, at the same time, uses the browser as a vehicle to handle the actual display and diary owner input. Using the browser avoids having to duplicate the browser functions that interface to the user and that display pages in accordance with HTML.

Figure 4I:
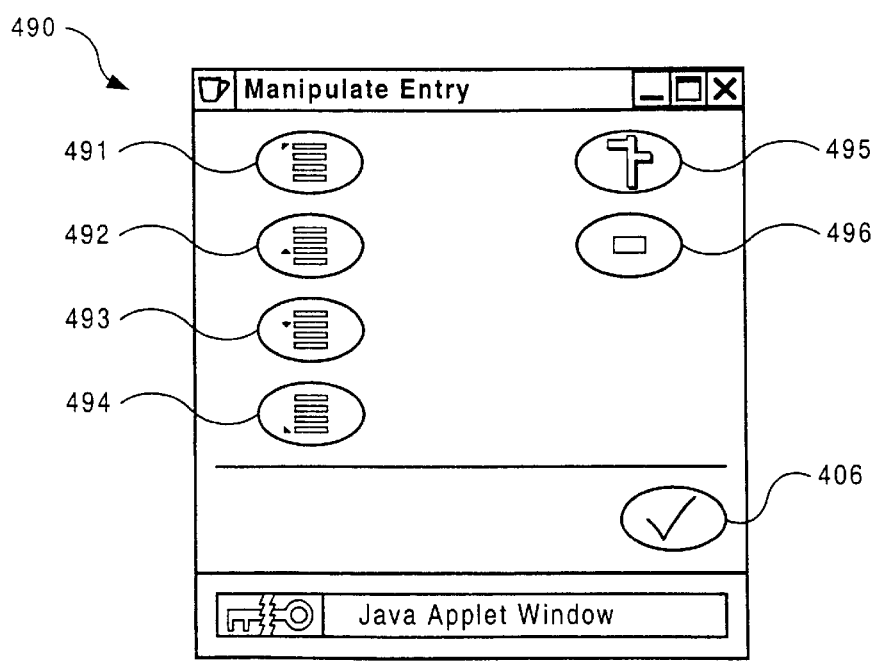
Figure 4J:
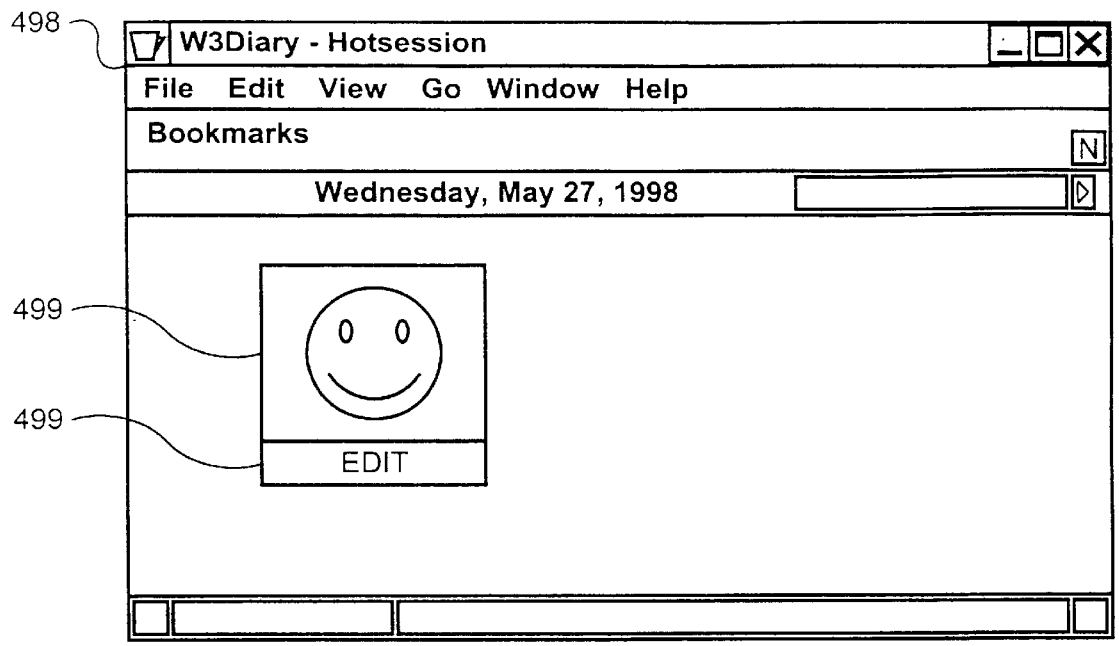

Thus, for example, in FIG. 4(j), diary applet 112 has already regenerated the diary page to display a handle 499 around the object and to add an executable program in the HTML for the diary page. This executable program is associated with the handle and will be executed when the handle is clicked. In the described embodiment, when the handle 499 is clicked, the associated executable program will pass the identity of the selected content object to applet 112, which will then display the window of FIG. 4(i). This window (and the other windows described herein) are generated by applet 112 and are not displayed via the browser. If the diary owner indicates via several presses of button 494 of FIG. 4(i) that the content object is to move to the bottom position, applet 112 will eventually regenerate the diary page to look like the diary page in FIG. 4(m). Note that the selected content object has been moved to the bottom right on this diary page (which the cover for this diary has defined as the bottom position of this diary page). Applet 112 communicates with the browser to display the regenerated HTML of the diary page. Once the diary owner clicks on accept button 406 of FIG. 4(i), applet 112 is caused to exit edit mode (via another executable program) and regenerates the diary page without handle 499 to yield a page such as the page of FIG. 4(n), where content object 401 is again displayed in its new position, but without a handle. The next time this page is saved to diary server 104, this positional change is saved in the user's diary information 122.

Figure 4K:
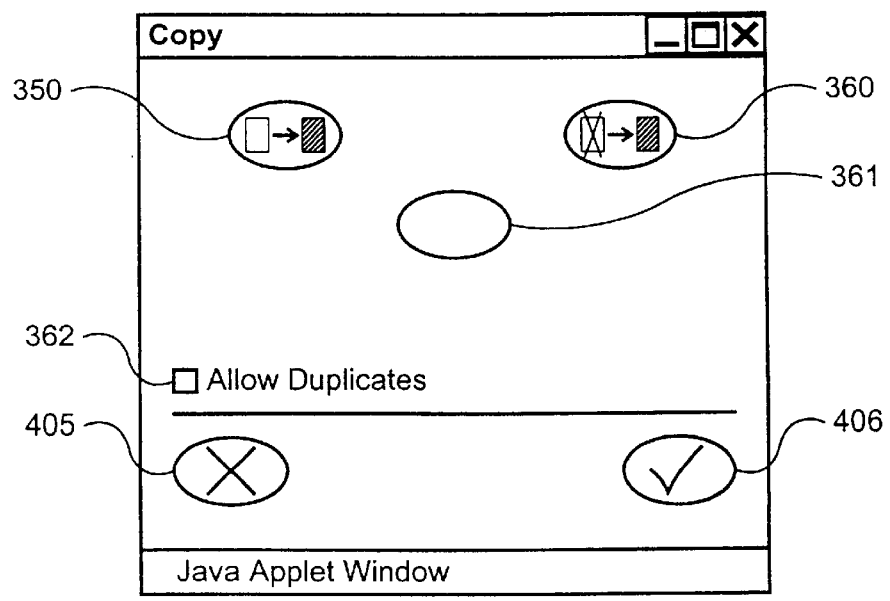
Figure 4M:
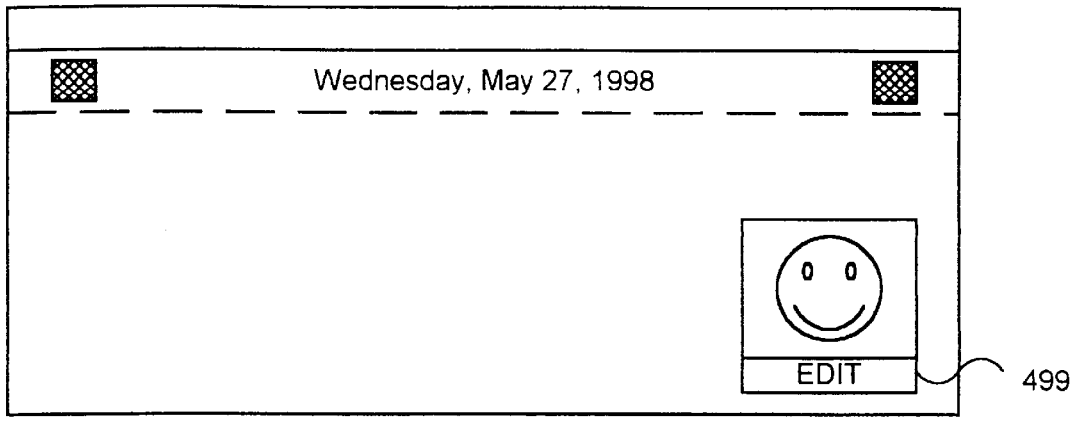
Figure 4N:
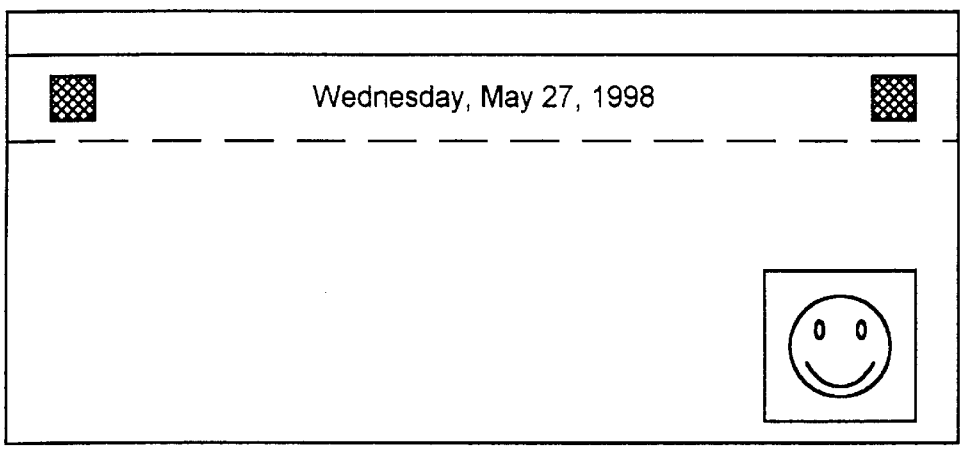
Figure 4O:
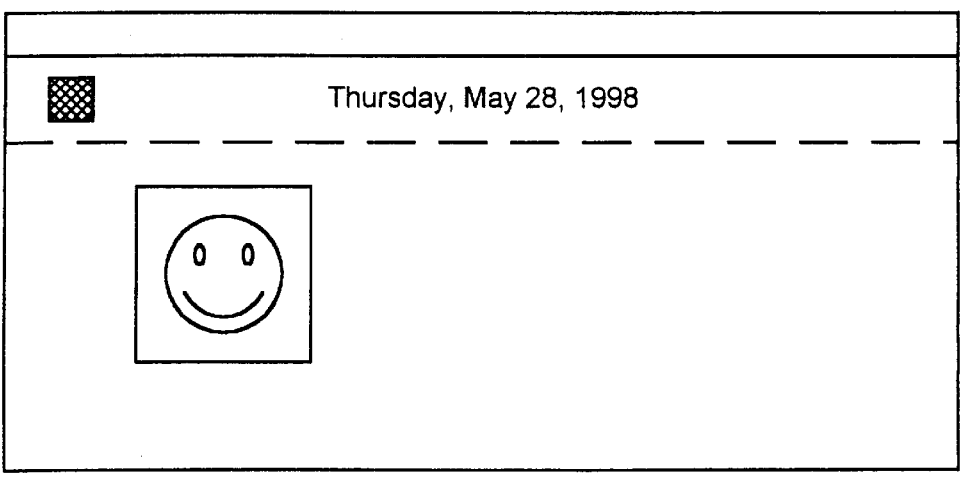

If the owner has entered edit mode and then presses button 495 of FIG. 4(i), applet 112 generates HTML for the window of FIG. 4(k), which allows the diary owner to perform various copy and move operations on a content object in a diary page. As another example, if the diary owner clicks handle 499 of FIG. 4(j), executable code in the regenerated page associated with the selected handle 499 executes to alert applet 112. If the user now clicks button 495, applet 112 displays the window of FIG. 4(k), which includes a copy button 350, a move button 360, and a delete button 361.

The destination section for a content object while copying or moving might already contain an identical content object. If the owner desires to have another content object in the destination section (i.e., one more than before the operation), he checks the "allow duplicates" box in FIG. 4(k). If he does not check this box, and if an identical content object already exists at the destination, the content object will not be put in the destination section.

If the diary owner indicates that he wants to copy the content object (by pressing button 350 of FIG. 4(k)), diary applet 112 will allow the diary owner to specify a dated or a named page in a manner similar to that of FIGS. 4(b) or 4(c). Diary applet 112 then regenerates HTML for the page to which the object is to be copied. When the diary owner exits edit mode, a page such as that of FIG. 4(o) will be displayed. Note, that in the example, the selected content object has been copied to a page having a different date than its original page. The next time this page is saved to diary server 104, this change is saved in the user's diary information 122. Note that in both examples above, an end-user has been able to modify a page displayable in a browser (e.g., a diary page) without writing any HTML code.

D. Transferring Data From a User's Diary to the Diary Server

It should be understood that, although the following example is described in terms of a transfer function for a diary, the transfer function described can be used in any circumstances where a first machine (such as system 106) sends data (e.g., third party content) to a second machine (such as system 102), and the data then needs to be send to a third machine (such as system 104) under control of an applet executing in a browser on the second system. The present invention is contemplated to be of use in non-diary applications, as well as in diary applications.

Figure 5A:
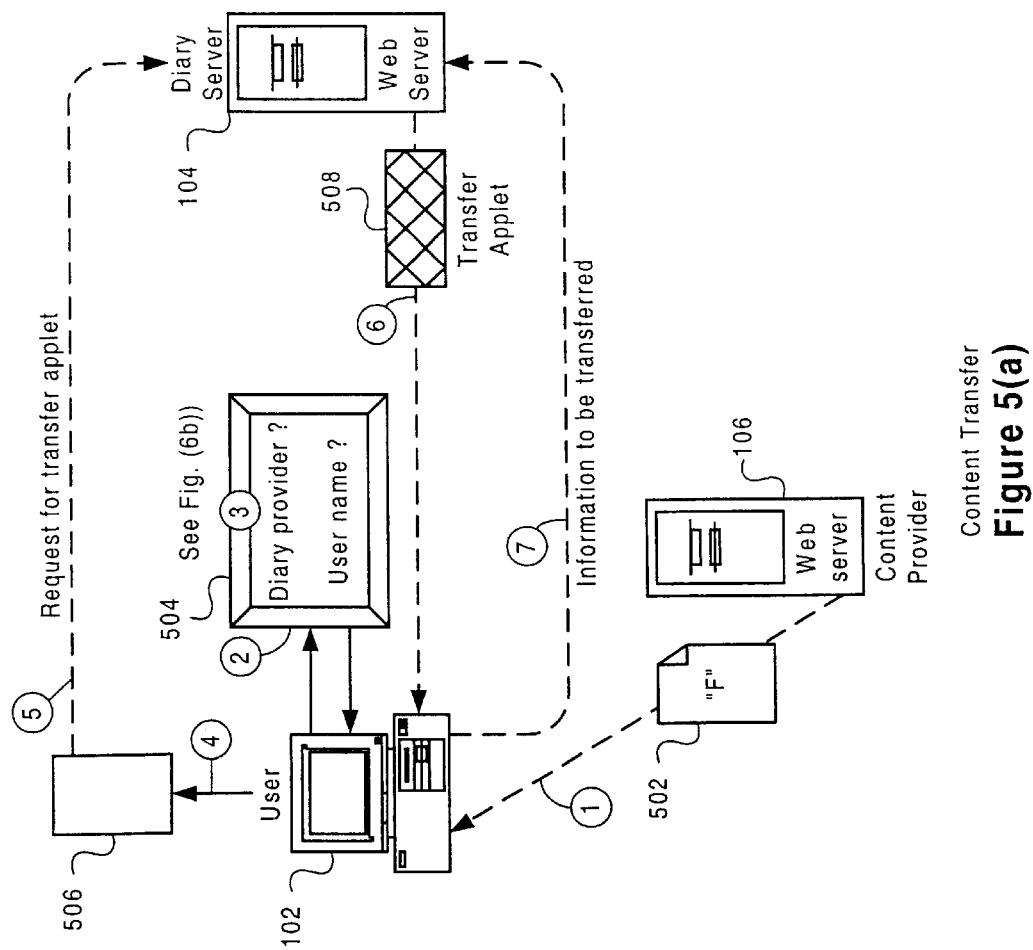
FIG. 5(*a*) shows an overview of a first embodiment of a data transfer function involving three machines.
Figure 5B:
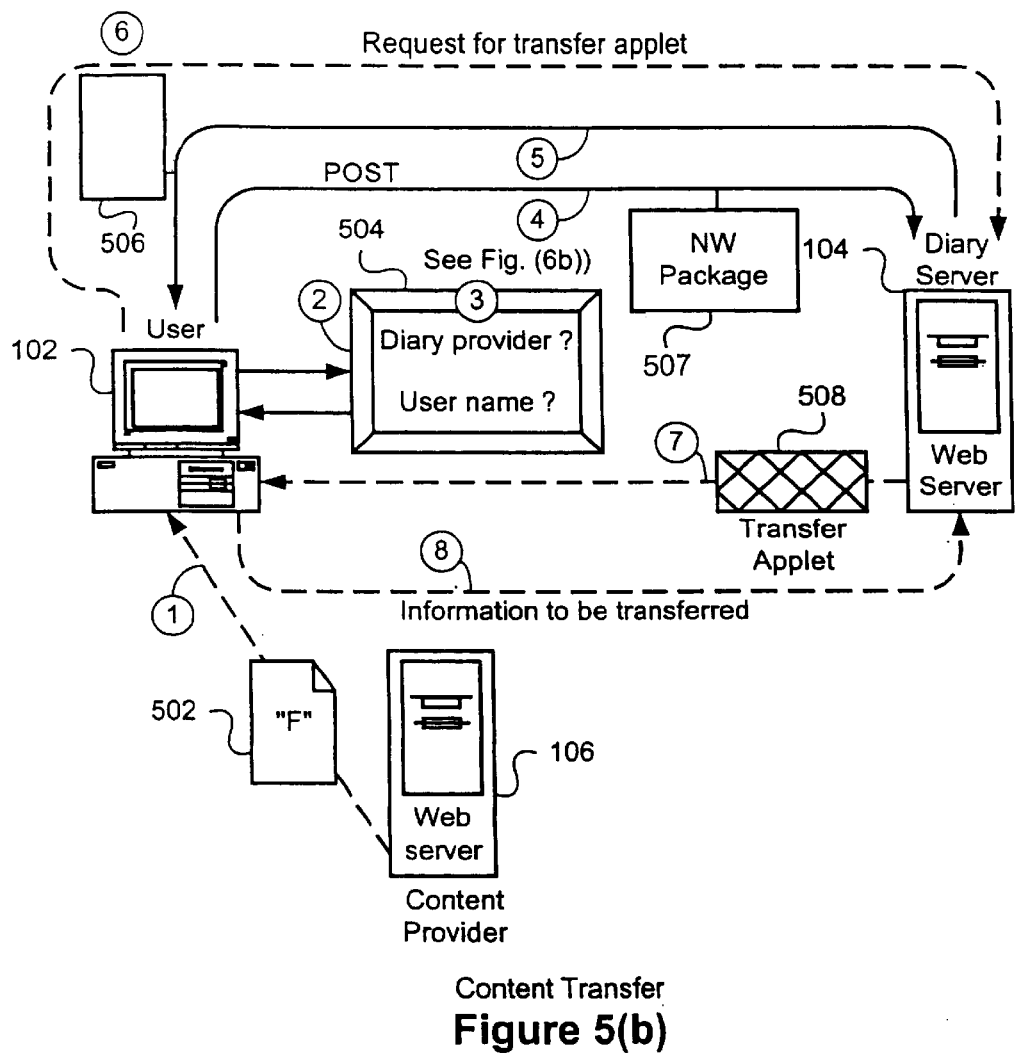
Figure 6A:
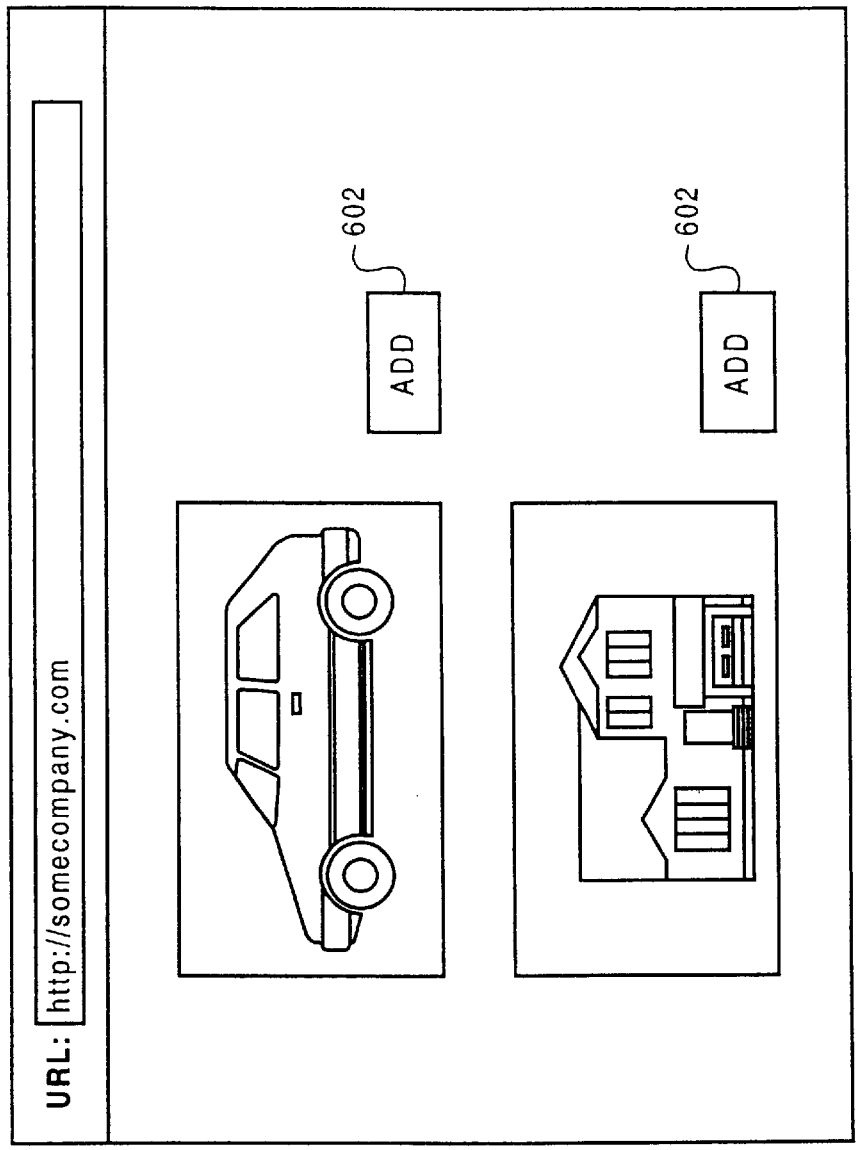
FIG. 6(*a*) shows a Web page fetched from a content provider system allowing the diary owner to add some content on the page to his diary.

FIG. 5(a) shows an overview of a first embodiment of a data transfer function involving three machines. FIG. 5(b) shows an overview of a second embodiment of a data transfer function, involving three machines. FIG. 5(a) will be discussed first. In step 1 of FIG. 5(a), the browser 110 loads the content provider's HTML page from system 106 into browser 110 in system 102. This HTML page includes a function "F" 502 that can be activated by the user via the HTML page (for example, by clicking on an "add" button on the page). The user looks at the content provider's page (as displayed by the browser) and determines whether there is any third party content on the page available for his diary that he wants to add to his diary. If so, the user so indicates. For example, in the described embodiment, the user clicks on an "add" button 602 on the TML page (see FIG. 6(a)) associated with the desired third-party content. licking on this content activates function "F" 502 within the displayed Web page, as shown in step 2 of FIG. 5(a). In the described embodiment, function "F" is a JavaScript, but it can be any appropriate form of executable program.

Figure 6B:
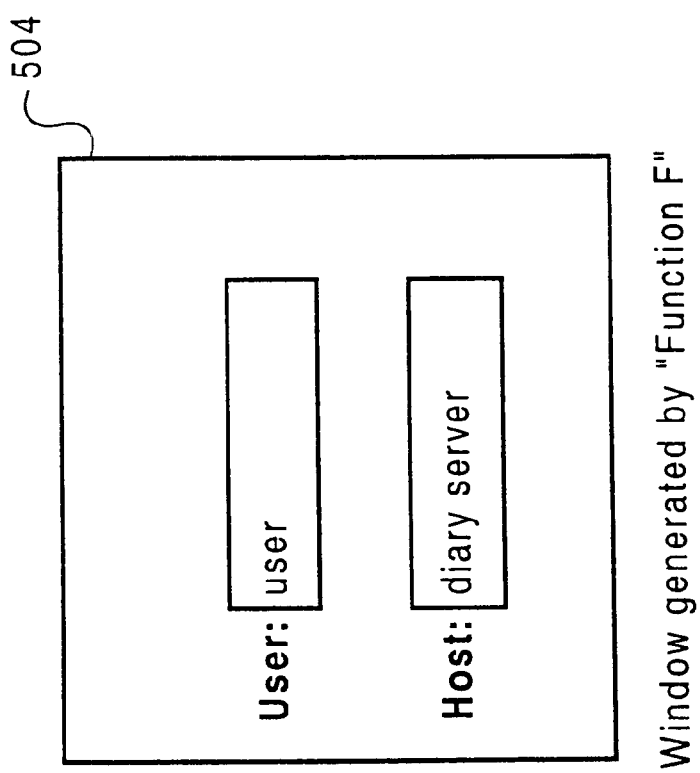

As shown in step 2 of FIG. 5(a), the function "F" pops up a window 504 that asks the user for his name and for the location of the diary provider 104 (step 3). Function "F" needs the name/exact location of diary provider 104 so that it can generate HTML page 506 (step 4) that requests the transfer applet 508 from the correct diary server 104. (Note that certain embodiments can have more than one diary server 104). An example of window 504 displayed by function "F" is shown in FIG. 6(b).

In step 4, the function "F" also generates HTML 506 that contains:

1) activation of a transfer applet (to be loaded from the diary server 104) (step 5 and 6), and
2) the parameters of the transfer applet containing all information about the provided content.

Thus, function "F" knows how to generate the HTML to activate transfer applet 508 (at the host stored by the user) with the parameters of the information to store.

In step 5, function "F" instructs browser 110 to load the HTML page 506 in a new HTML-browser window. By loading that page 506, the browser will load and execute the transfer applet 508 on system 102 (step 6). When transfer applet 508 executes, it transfers data to system 104. The function "F" uses a priori knowledge about the name/exact location of the transfer applet on diary server 104. Similarly, function "F" uses a priori knowledge about the names and semantics of the parameters required by the transfer applet.

It is important to note that, due to security restrictions common to many implementations of execution environments of programs such as Java applets, transferring data between three machines (102, 104, 106) is problematic.

Because the data eventually has to be stored on system 104, because communication may entries to sections set up with the diary applet already running on the system 102, and because the diary applet was loaded from system 104, the transfer applet 508 also must be loaded from system 104. The problem is how to get the information describing the content provided to the transfer applet 508 if the transfer applet is to be loaded from server 104. For instance, the transfer applet is not allowed to connect to the content provider system 106. The problem is solved by generating the HTML page 506, which contains the instructions that activate the transfer applet 508 in combination with all information about the content provided that should be handled by the transfer applet. In other words, the HTML page 506 is self-contained and the transfer applet activated by it can handle the transfer without any other communication other than with its source system 104, which is allowed since it was loaded from system 104. Thus, the method shown in FIG. 5(a) solves the problem caused by the security restraints of the execution environment.

In at least one embodiment, the database is not really transferred immediately, but is only scheduled for storage. A running diary applet performs the actual storage. If there is no running diary applet in browser 110, the transfer applet will start one. Similarly, in at least one embodiment, all applets store to a "store queue." This way, the transfer applet 508 can insert a database in the queue that will be processed by another diary applet 112. Sharing of the new content (as transferred by the transfer applet) with the diary applet is extremely important because the new content will have to be made visible by the diary applet immediately and efficiently, e.g., it would not be acceptable if it would require a user action in order to view the new content. Similarly, it would not be acceptable if it would require a full "re-upload" of the diary information 114 by the diary applet in order to view the new content. The underlying fundamental mechanism on which the sharing has been based is the sharing of class variables in a single Java virtual machine.

Table 1 shows an example of a JavaScript that performs the function of function "F" of FIG. 5(b). Table 1, which is an HTML/Javascript, forms a part of the specification and is incorporated herein only for purposes of example.

FIG. 5(b) shows an alternate embodiment of a transfer function in which the function "F" does not have a priori knowledge about the name/exact location of the transfer applet 508. It can be advantageous to have function "F" not know the name/exact location of the transfer applet. Because there are many function "F"s in the network—each content provider 106 has HTML containing a version of function "F"—it can be problematic if the diary server 104 decides to change the name of the transfer applet 508. If each function "F" (which resides on the content provider(s) 106) knows the name of the transfer applet 508, each function "F" would have to be changed if the name/location of the transfer applet 508 is changed. If the function "F" does not know this information, function "F"does not have to change if the name of the transfer applet 508 stored on system 104 changes.

In FIG. 5(b), function "F" (received from system 106) pops up window 504 as described above and creates a "network package" 507 that contains at least:

the name of the server 104;
the name of the user; and
the properties of the content to be transferred.

Network package 507 is POSTed to diary server 104. Diary server 104 generates the page 506 using the information in the network package 507 and returns it to function "F" in system 102. Function "F" continues as in FIG. 5(a). Specifically, function "F" instructs browser 110 to load the HTML page 506 in a new HTML-browser window. From this point onwards, the embodiment of FIG. 5(b) behaves as the embodiment of FIG. 5(a).

It will be appreciated that in this embodiment, the a priori knowledge of function "F" is limited to only the way the network package 507 is to be structured, the content that is to be put into network package 507, and the way this package 507 is to be sent to diary server 104. The amount of knowledge required is less than the knowledge required to generate page 506 itself.

It will be appreciated that the embodiment of FIG. 5(b) limits the "outer world" restrictions on the interface of diary server 104. Once the diary server 104 is in operation (as illustrated in FIG. 5(b)), it should always support the handling of network packages 507. However, the internals of page 506 may be changed by the diary server 104 whenever such a change is required. Note that such a change is not an option in the embodiment of FIG. 5(a), since the a priori knowledge about the contents of page 506 have been spread over numerous content provider systems 106.

Figure 7A:
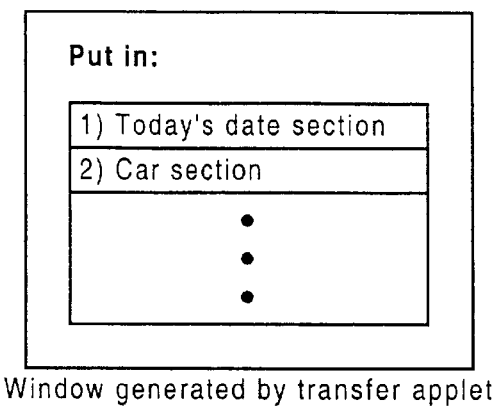
FIG. 7(*a*) shows an example of a window displayed during transfer of data between three machines.
Figure 7B:
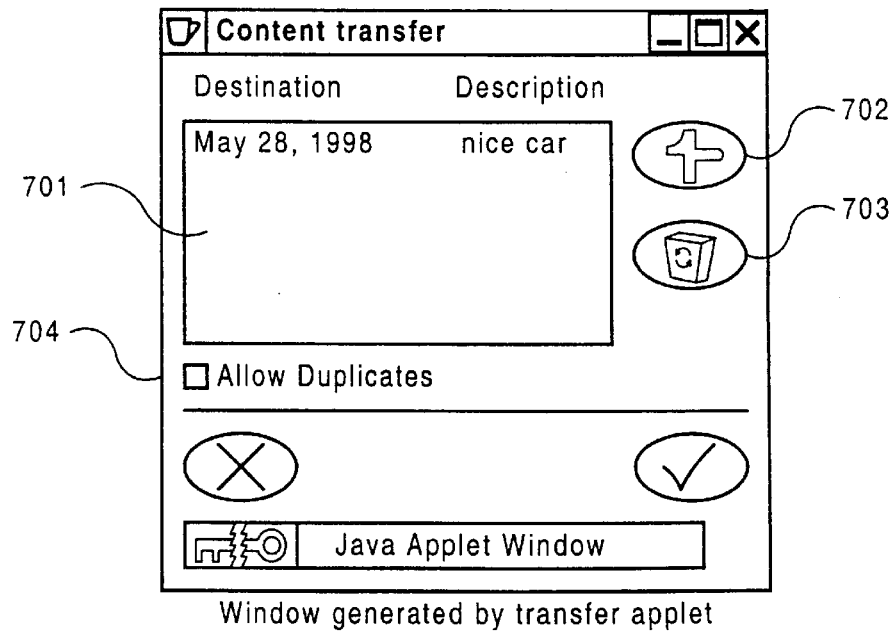

FIGS. 7(a) and 7(b) show examples of windows displayed by transfer applet 508 during transfer of data between three machines. As described above, once page 506 is loaded, the transfer applet 508 will be activated automatically and it will pop-up the window shown in FIG. 7(b). This window shows a list 701 that represents the objects being transferred. In the Figure, there is only one object to be transferred. Each entry is represented by a textual line that consists of the suggested destination (or the destination suggested by the user, see below) for the entry (in this case, the section May 28, 1998), followed by a textual description of the entry (which in this case is "nice car").

Each of the entries in the current transfer may be deleted from the list 701 by selecting the entry in the list 701 and then clicking delete button 703. The destination section of each entry in the current transfer may be changed by selecting the entry in the list and then clicking the button 702. The transfer applet 508 will pop-up a window similar to that of FIG. 7(a). FIG. 7(a) is simplified in that the user will be able to select any date for the destination section or any of the named sections that exist in the diary. The role of the check 704 is exactly like the role of check 406 described above.

After the user has deleted the entries that he is not interested in, and after he has changed the destinations of entries to sections that he considered appropriate, he presses either the OK button 406 (FIG. 4(b)) or the cancel button 405. If the cancel button is pressed, the whole transfer is cancelled. If the OK button is pressed, the transfer applet 508 will add the entries to the AUA-database in the user diary data 122 on the user system 102. In one embodiment, transfer applet 508 issues a "store" command that is queued in the store queue and checks whether a diary applet is already running. If no diary applet is running, the transfer applet will start a diary applet automatically.

E. System Architecture

Figure 8:
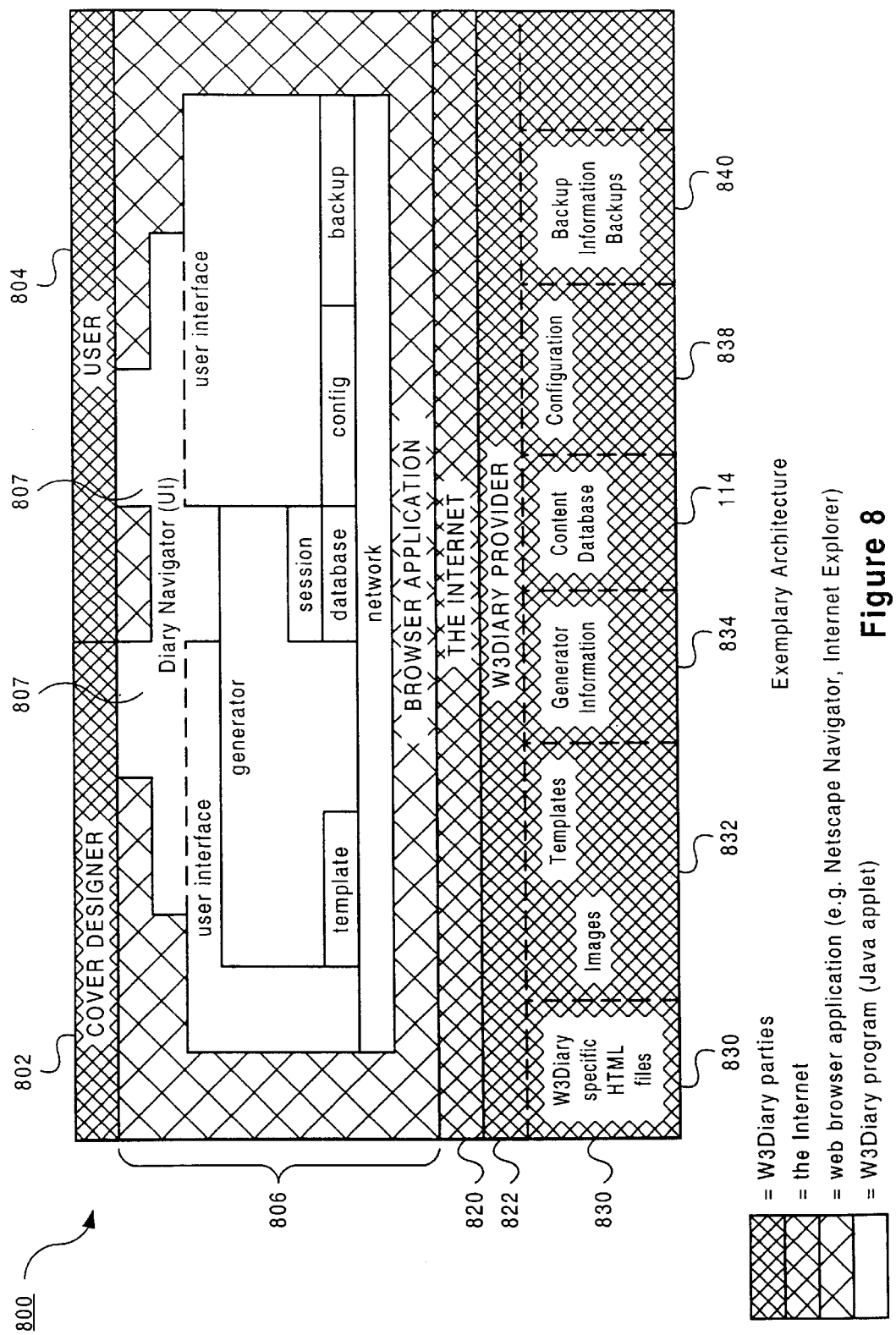
FIG. 8 shows an exemplary architecture for an embodiment of the present invention.

FIG. 8 shows an exemplary architecture for an embodiment of the present invention. As shown by the key, the architectural diagram includes a top layer representing two types of users: cover providers 802 and users 804 (diary owners and other users). A section 806 represents the functionality of diary applet 112. A section 820 represents browser 110. A section 822 represents the Internet (or other appropriate network or way of communicating between entities). A section 830 represents diary software, such as diary software 124 of diary server 104.

In the described embodiment, cover providers and end-users both run diary applet 112. However, cover providers have access to special functionality for constructing covers that end users do not have. It should be noted that diary applet 112 runs "inside" browser 110. It communicates with the user through the browser window and through its own user interface 807. The diary navigator 807 provides standard navigation functionality to the user (via navigation bar 402). It also acts as an intermediary between the browser and the rest of the diary applet 112. One of its important tasks is to transfer the pages of the diary to browser 110. Diary pages are generated by a generator in the diary applet. This generation is performed by combining data from covers (also called "presentation contexts") designed by a cover provider and the content that the user has gathered for his diary.

Because of privacy concerns, content is "filtered" by the session layer, which allows the user to see only the content that he is permitted to see. The user's content is stored in the AUA-database. User settings are stored as configuration data, which includes the passwords required for users to access the different privacy levels. The user also has the ability to create backups of the AUA-database.

The network layer takes care of transferring all diary files over the Internet (or other network) between the user and the content provider. In the described embodiment, all network traffic is routed through the browser 110. This is necessary to be compatible with proxy and firewall setups in corporate networks. All files preferably are stored in a diary server, such as diary server 104. They can be accessed from anywhere on the network.

F. Data Structures

FIG. 9 lists exemplary files provided by cover providers in a preferred embodiment of the present invention. FIG. 10 lists exemplary files provided to generate the contents of diary pages in a preferred embodiment of the present invention. As shown in FIGS. 8 and 9, these files include cover-specific files, such as: diary specific HTML files, images, HTML-covers, and a generator configuration file. As shown in FIGS. 8 and 10, these files further include user-specific files, such as: diary information, a user config file 838, and backup information 840.

FIG. 11 shows an exemplary format of an AUA-database of FIG. 10. As discussed above, the described embodiment supports the following types of content: plain text, images, applets, and embedded objects. The AUA-database is broken into two types of sections: dated sections (see, for example, FIG. 4(o)) and named sections (see, for example, FIG. 4(a)). In the example, the dated sections include a number of dated sections 1106. The named sections include a number of named sections 1110. Each dated section 1106 is broken into a plurality of dated content entries 1108. Each named section 1110 is broken into a number of content entries 1112. In the described embodiment, the entire structure 114 is stored as a ASCII document. Because bandwidth and storage capacity are scarce resources in the diary applet 112, certain embodiments compress larger Java objects when they are stored.

FIG. 12 shows exemplary cover HTML-files. Covers are also called "presentation contexts." In one embodiment of the present invention, the presentation context can consist of HTML files in which "on the fly" substitutions by the diary applet are performed. FIG. 12 shows the rules to apply to such HTML-files. As an example, the occurrence of a "wifentry.gif" object in a cover represents a box in which the diary applet may place the representation of a content object.

As another example, a list of textual strings such as __YEAR__ will be substituted by the diary applet by the year (e.g., "1998") of the date section that is to be shown.

FIG. 13 shows a diagram of a relationship between various kinds of covers and the layout of pages generated by a diary applet in an embodiment of the present invention.

In summary, the described embodiment of the present invention allows users to create "diaries" that can be read via a web browser. The owner of a diary can read his own diary and certain non-private parts of the diary can be read by other persons. Thus, the owner of the diary can control what is presented to various classes of persons via his diary. The owner can identify various pages, sections, or content objects as having a certain privacy level. When a diary applet executing in the browser receives information for the user's diary, the diary applet generates HTML only for those portions of the diary that have a privacy level lower than or equal to the privacy level of the viewer who is viewing the diary. Thus, it is possible that the diary applet will generate different HTML pages for an owner and for a random stranger who each ask to view the same diary page on their respective browsers. The person viewing a diary page can only view that content marked as appropriate for him and other people at his privacy level. The diary applet of the described embodiment asks for a password to determine a privacy level of a person. The correct password values are part of the configuration information for a diary.

A user can navigate amongst diary pages like pages in a book. A user can add various types of content to his diary page and can also add content provided by content providers via their Websites. The diary owner can also move content around on a diary page and can copy or move content from one page or section to another page or section. The diary owner can also transfer content from the diaries of others, assuming that the original creator of the content object allows transfer of the object. The original creator might have been the diary owner, another diary owner, or a content provider.

The invention uses a transfer method that avoids certain security restrictions that are problematic when downloading third party content to a diary.

While the invention has been described in conjunction with a specific embodiment, it is evident that many alternatives, modifications and variations will be apparent to those skilled in the art in light of the foregoing description. For example, diary applet 112 could, instead be implemented as a plug-in to browser 110. This has the advantage of being free of the Java "sandbox," but requires a different plug-in for each type of browser and needs to be installed by the user before it can be used. The functionality of the diary applet 112 could also be implemented in the browser. Moreover, some or all of the of the processing and selection of content could be performed on the diary server 104, thus saving the amount of data that must be transferred to the browser. Similarly, all of the HTML generation could be performed by the diary server 104. This might lower the bandwidth required and would simplify the transfer mechanism. However, when envisioned in an application of the invention where millions of users use a diary, this places an unacceptable burden on the diary server(s) 104. In the described embodiment, the processing capabilities of the user systems 102 are used to avoid this problem. Accordingly, it is intended to embrace all such alternatives, modifications and variations as fall within the spirit and scope of the appended claims and equivalents.

TABLE 1

```
<!DOCTYPE HTML PUBLIC "-//IETF//DTD HTML//EN">
<htmp>
<head>
<script language="JavaScript">
<!-- don't edit by hand
W3Content_0='' +
'MDlhPXNyYzlodHRwOi8vd3d3LmZlcnJhcmkuaXQvY29udGVudC9mMzAwLmpwZlxc' +
'bmhlaWdodD0xNjhcXG53aWR0aD0zMjBcXG5cbmU9bGluazlodHRwOi8vd3d3LmZl' +
'cnJhcmkuaXRcXG5ldHlwZT0xXFxuXG4K';
W3Content_1='' +
'MDlhPXNyYzlodHRwOi8vd3d3LmZlcnJhcmkuaXQvY29udGVudC9mMzAwX2ZyLmpw' +
'ZlxcbmhlaWdodD0yNDdcXG53aWR0aD00MDHcXGScbmU9bGluazlodHRwOi8vd3d3' +
'LmZlcnJhcmkuaXRcXG5ldHlwZT0xXFxuXG4K';
W3Content_2='' +
'MDlhPXNyYzlodHRwOi8vd3d3LmZlcnJhcmkuaXQvY29udGVudC9mMzAwX3RvC5q' +
'cGdcXG5oZWlnaHQ9MTg4XFxud2lkGg9NDAwXFxuXG5lPWxpbms9aHR0cDovL3d3' +
'dy5mZXJyYXJpLml0XFxuZXR5cGU9MVxxcblxuCg==';
W3Content_3='' +
'MjlhPXNyYzlodHRwOi8vd3d3LmZlcnJhcmkuaXQvY29udGVudC9mMzAwLmpwZlxc' +
'bmhlaWdodD0xNjhcXGS3aWR0aD0zMjBcXGScbmU9bGluazlodHRwOi8vd3d3LmZl' +
'cnJhcmkuaXRcXG5ldHlwZT0xXFxuXG4KMT1hPXNyYzlodHRwOi8vd3d3LmZlcnJh' +
'cmkuaXQvY29udGVudC9mMzAwX2ZyLmpwZ1xcbmhlaWdodD0yNDdcXG53aWR0aD00' +
'MDBcXG5cbmU9bGluazlodHRwOi8vd3d3LmZlcnJhcmkuaXRcXG5ldHlwZT0xXFxu' +
'XG4KMD1hPXNyYzlodHRwOi8vd3d3LmZlcnJhcmkuaXQvY29udGVudC9mMzAwX3Rv' +
'cC5qcGdcXG5oZWlnaHQ9MTg4XFxud2lkGg9NDAwXFxuXG5lPWxpbms9aHR0cDovv' +
'L3d3dy5mZXJyYXJpLml0XFxuZXR5cGU9MVxxcblxuCg==';
function loadTransfer(params) {
    loginWin=open ("", getWindowName ( ),
            'width=350, height=130, scrollbars=no');
    content = params;
    setTimeout ('writeContent (content)', 1000);
}
function writeContent(content) {
    loginWin.document.open ( );
    doc = loginWin.document;
    doc.writeln('<HTML><TITLE>Type the location of your W3Diary:</TITLE>');
    doc.writeln('<HEAD>');
    doc.writeln('');
    doc.writeln('<sc' + 'ript language="JavaScript">');
    doc.writeln('');
    doc.writeln('<!-- ')
    doc.writeln('');
    doc.writeln('fu' +
            'nction setCookie(name, value, expires, path, domain, secure) {');
    doc.writeln('        document.cookie = name + "=" + escape (value) + ');
    doc.writeln('        ((expires) ? "; ' +
            'expires=" + expires.toGMTString( ) : "") +');
    doc.writeln('        ((path) ? "; path=" + path : "") +');
    doc.writeln('        ((domain) ? "; domain=" + domain : "") +');
    doc.writeln('        ((secure) ? "; secure" : "");');
    doc.writeln('}');
    doc.writeln('');
    doc.writeln('fu' + 'nction getCookie(name) {');
    doc.writeln('    va' + 'r arg = name + "=";');
    doc.writeln('    va' + 'r alen = arg.length;');
    doc.writeln('    va' + 'r clen = document.cookie.length;');
    doc.writeln('    va' + 'r i = 0;');
    doc.writeln('    while (i < clen) (');
    doc.writeln('        va' + 'r j = i + alen;');
    doc.writeln('        if (document.cookie.substring(i, j) == arg) {');
    doc.writeln('            va' +
        'r endstr = document.cookie.indexOf(";", j);');
    doc.writeln('            if (endstr == -1) {');
    doc.writeln('                endstr = document.cookie.length;');
    doc.writeln('            }');
    doc.writeln('            re' +
            'turn unescape(document.cookie.substring(j, endstr));');
    doc.writeln('        }');
    doc.writeln('        i = document.cookie.indexof(" ", i) + 1;');
    doc.writeln('        if (i == 0) break;');
    doc.writeln('    }');
    doc.writeln('    re' + 'turn "";');
    doc.writeln('}');
    doc.writeln('');
    doc.writeln('fu' + 'nction addContent( ) {');
    doc.writeln('    va' + 'r expire = new Date ( );');
    doc.writeln('    va' +
            'r oneDay = expire.getTime( ) + (24 * 60 * 60 * 1000);');
    doc.writeln('    expire.setTime(oneDay);');
```

TABLE 1-continued

```
    doc.writeln('     setCookie("w3duser", ' +
        ' document.nhf.user.value, expire);');
    doc.writeln('     setCookie("w3dhost", ' +
        ' document.nhf.host.value, expire);');
    doc.writeln('     document.nhf.action="http://" +' +
        document.nhf.host.value +' +
        "/transfer/" + document.nhf.user.value;');
    doc.writeln('     // document.nhf.submit( );');
    doc.writeln('');
    doc.writeln('     loginWin=open("", "' +
        getWindowName( ) +
        '", \'width=350,height=130,scrollbars=no\');');
    doc.writeln('     setTimeout(\'writeContent( )\', 1000);');
    doc.writeln ('}');
    doc.writeln ('');
    doc.writeln('fu' + 'nction writeContent( ) {');
    doc.writeln('     loginWin.document.open( );');
    doc.writeln('     doc = loginWin.document;');
    doc.writeln('     doc.writeln(\'<HTML>\');');
    doc.writeln('doc.writeln(\'<BODY onLoad="document.nw.submit( )">\');');
    doc.writeln('doc.writeln(\'<FORM method="POST" name="nw" action="\" +
        ' + document.nhf.action+ \'">\');');
    doc.writeln('     doc.writeln(\'<INPUT type=hidden name="user"
value="\"
        + ' + document.nhf.user.value+ \'">\');');
    doc.writeln('     doc.writeln(\'<INPUT type=hidden name="host"
value="\"
        + ' + document.nhf.host.value+ \'">\');');
    doc.writeln('     doc.writeln(\'<INPUT type=hidden name="content"' +
        ' value="\' + document.nhf.content.value+ \'">\');');
    doc.writeln('     doc.writeln(\'</FORM>\');');
    doc.writeln('     doc.writeln(\'</BODY>\');');
    doc.writeln('     doc.writeln(\'</HTML>\');');
    doc.writeln('     doc.close( );');
    doc.writeln('     window.close( );');
    doc.writeln('}');
    doc.writeln('');
    doc.writeln('fu' + 'nction initFields( ) {');
    doc.writeln('     document.nhf.user.value=getCookie("w3duser");');
    doc.writeln('     document.nhf.host.value=getCookie("w3dhost");');
    doc.writeln('}');
    doc.writeln('          ');
    doc.writeln('// -->');
    doc.writeln('          ');
    doc.writeln('</sc' + 'ript>');
    doc.writeln('          ');
    doc.writeln('</HEAD>');
    doc.writeln('');
    doc.writeln('<BODY bgcolor="#FFFFFF" onLoad="initFields( )">');
    doc.writeln('');
    doc.writeln('<FORM method="POST" name="nhf">');
    doc.writeln('<TABLE border=O><TR><TD>user:');
    doc.writeln('<TD COLSPAN=2 align=right>');
    doc.writeln('<INPUT size=30 name="user"><BR>');
    doc.writeln('<TR><TD>host: </TD>');
    doc.writeln('<TD COLSPAN=2 align=right>');
    doc.writeln('<INPUT size=30 name="host"><BR>');
    doc.writeln('<TR><TD></TD><TD>');
    doc.writeln('<INPUT type=button value="Add Content"' +
        'onClick="addContent ( ) ">');
    doc.writeln('</TD><TD align=right>');
    doc.writeln('<INPUT type=button value="Cancel"' +
        onClick="window.close ( ) ">');
    doc.writeln('</TD></TR></TABLE>');
    doc.writeln('<INPUT type=hidden name="content" value="' +
        content+ '" >');
    doc.writeln('</FORM>');
    doc.writeln('');
    doc.writeln('</BODY>');
    doc.writeln('</RTML>');
    doc.close( );
}
function getWindowName( ) {
    wName = '' + Math.random( );
    return 'W3Diary_' + wName.substring(wName.indexOf('.') + 1);
}
// -->
</script>
<meta http-equiv="Content-Type"
```

TABLE 1-continued

```
content="text/html; charset=iso-8859-1">
<meta name="GENERATOR" content="Microsoft FrontPage 2.0">
<title>CompanyAari Content</title>
</head>
<body bgcolor="#FFFFFF" text="#000000" link="#C70000"
vlink="#C70000" alink="#C70000">
<p align="center"><img src=". . /images/s_content.gif" width="120"
height="43"><img src=". . /images/i_style.gif" width="242"
height="43"></p>
<div align="center"><center>
<table border="0" cellpadding="0" cellspacing="5">
    <tr>
        <td align="center" width="50%">The new 1998 CompanyA product<p>
            <a href = "JavaScript:loadTransfer(W3content_0)"
      onMouseOver="status='Click to add W3Diary Content';return true;">
            <img
            src="http://www.1stprov.nl/images/w3diary_logo.gif"></a></p>
        </td>
        <td width="50%"><img src="product.jpg" width="200"
        height="120"></td>
    </tr>
    <tr>
        <td align="center" width="50%">The new 1998 CompanyA product<p>
            <a href = "JavaScript:loadTransfer(W3Content_1)"
      onMouseOver="status='Click to add W3Diary Content';return true;"><img
            src="http://www.1stprov.nl/images/w3diary_logo.gif"></a></p>
        </td>
        <td width="50%"><img src="product_fr.jpg" width="200"
        height="120"></td>
    </tr>
    <tr>
        <td align="center" width="50%">The new 1998 CompanyA product<p>
            <a href = "JavaScript:loadTransfer(W3Content_2)"
      onMouseOver="status='Click to add W3Diary Content';return true; "><img
            src="http://www.1stprov.nl/images/w3diary_logo.gif"></a></p>
        <td>
        <td width="50%"><img src="product_top.jpg" width="200"
        height="120"></td>
    </tr>
</table>
<p>
Or get them <a href="JavaScript:loadTransfer(W3Content_3)"
onMouseOver="status='Click to add W3Diary Content';return true;">all three</a>
</center></div>
</body>
</html>
```

What is claimed is:

1. A method of organizing information for display, comprising:

sending from a diary server to a user system, a diary program capable of being executed by a browser in the user system;

sending diary information from the diary server to the user system, the information comprising content data including an associated time, a page design to specify the presentation of the content data, and configuration information for controlling behavior of a cohesive diary page, the configuration information including privacy level information;

assembling the cohesive diary page by dynamically combining the content data and the page design in accordance with the configuration information for the cohesive diary page to be displayed by the diary program running in the browser;

receiving by the diary server at least one request for at least one change concerning the diary information, from the diary program in the user system; and sending, by the diary server to the user system, new diary information for changing the cohesive diary page.

2. The method of claim 1 wherein the diary information is for displaying a plurality of diary pages, where each diary page presents content data and configuration information as an integrated whole.

3. The method of claim 1 wherein the diary page is organized according to at east one of: by date and by topic.

4. The method of claim 1 wherein the new diary information is for changing content of the diary page without changing a general appearance of the diary page.

5. The method of claim 1 wherein the new diary information is for changing an appearance of the diary page without changing content of the diary page.

6. A method of displaying and organizing information, comprising;

receiving, by a use system from a diary server, a diary program capable of being run by a browser in the user system:

receiving, by the user system from the diary server, diary information comprising content data including an associated time, a page design to specify the presentation of the content data, and configuration information for controlling behavior of a cohesive diary page, the configuration information including privacy level information;

assembling the cohesive diary page by dynamically combining the content data and the page design in accordance with the configuration information; and displaying the cohesive diary page, by the diary program running in the browser.

7. The method of claim 6, further comprising:
displaying contents of the diary page by the diary program in accordance with a cover for a diary.

8. The method of claim 7, wherein the cover includes advertisements requested by a user.

9. The method of claim 7, wherein the cover includes advertisements not requested by a user.

10. The method of claim 7, wherein the cover includes product placements determined by a cover provider.

11. The method of claim 7, wherein the cover is created by a cover provider.

12. The method of claim 6, wherein the diary page includes a reference to a content object created by a third party content provider.

13. The method of claim 6, wherein the diary page includes a reference to a content object created by a diary owner.

14. The method of claim 6 further comprising:
displaying a plurality of diary pages, where each diary page presents content data and configuration information as an integrated whole.

15. The method of claim 6 further comprising:
receiving, from the diary server, new diary information;
changing content of the diary page without changing a general appearance of the diary page, in accordance with the new diary information.

16. The method of claim 6 further comprising:
receiving, from the diary server, new diary information;
changing an appearance of the diary page without changing content of the diary page, in accordance with the new diary information.

17. An apparatus that displays and organizes information, comprising:
a software portion configured to receive, by a user system from a diary server, a diary program capable of being run by a browser in the user system;
a software portion configured to receive, by the user system from the diary server, diary information comprising content data including an associated time, a page design to specify the presentation of the content data, and configuration information for controlling behavior of a cohesive diary page, the configuration information including privacy level information;
a software portion configured to assemble the cohesive diary page by dynamically combining the content data and the page design in accordance with the configuration information; and
a software portion configured to display the cohesive diary page, by the diary program running in the browser.

18. The apparatus of claim 17, further comprising:
a portion configured to display contents of the diary page by the diary program in accordance with a cover for a diary.

19. The apparatus of claim 18, wherein the cover includes advertisements requested by a user.

20. The apparatus of claim 18, wherein the cover includes advertisements not requested by a user.

21. The apparatus of claim 18, wherein the cover includes product placements determined by a cover provider.

22. The apparatus of claim 18, wherein the cover is created by a cover provider.

23. The apparatus of claim 17, wherein the diary page includes a reference to a content object created by a third party content provider.

24. The apparatus of claim 17, wherein the diary page includes a reference to a content object created by a diary owner.

25. The apparatus of claim 17 further comprising:
a portion configured to display a plurality of diary pages, where each diary page presents content data and configuration information as an integrated whole.

26. The apparatus of claim 17 further comprising:
a portion configured to receive, from the diary server, new diary information;
a portion configured to change content of the diary page without changing a general appearance of the diary page, in accordance with the new diary information.

27. The apparatus of claim 17 further comprising:
a portion configured to receive, from the diary server, new diary information;
a portion configured to change an appearance of the diary page without changing content of the diary page, in accordance with the new diary information.

28. A computer program product comprising computer program code on a computer readable medium for displaying and organizing information, the computer program product comprising:
computer program code for receiving, by a user system from a diary server, a diary program capable of being run in a browser in the user system;
computer program code for receiving, by the user system from the diary server, diary information comprising content data including an associated time, a page design to specify the presentation of the content data and configuration information for controlling behavior of a cohesive diary page, the configuration information including privacy level information;
computer program code for assembling the cohesive diary page by dynamically combining the content data and the page design in accordance with the configuration information; and
computer program code for displaying the cohesive diary page, by the diary program, running in the browser.

29. The computer program product of claim 28, further comprising:
program code for displaying contents of the diary page by the diary program in accordance with a cover for a diary.

30. The computer program product of claim 29, wherein the cover includes advertisements requested by a user.

31. The computer program product of claim 29, wherein the cover includes advertisements not requested by a user.

32. The computer program product of claim 29, wherein the cover includes product placements determined by a cover provider.

33. The computer program product of claim 29, wherein the cover is created by a cover provider.

34. The computer program product of claim 28, wherein the diary page includes a reference to a content object created by a third party content provider.

35. The computer program product of claim 28, wherein the diary page includes a reference to a content object created by a diary owner.

36. The computer program product of claim 28 further comprising:
program code for displaying a plurality of diary pages, where each diary page presents content data and configuration information as an integrated whole.

37. The computer program product of claim 28 further comprising:
program code for receiving, from the diary server, new diary information;

program code for changing content of the diary page without changing a general appearance of the diary page, in accordance with the new diary information.

38. The computer program product of claim 28 further comprising:

program code for receiving, from the diary server, new diary information;

program code for changing an appearance of the diary page without changing content of the diary page, in accordance with the new diary information.

39. A system for displaying and organizing information comprising:

means for receiving, by a user system from a diary server, a diary program capable of being run by a browser in the user system;

means for receiving, by the user system from the diary server, diary information comprising content data including an associated time, a page design to specify the presentation of the content data, and configuration information for controlling behavior of a cohesive diary page, top configuration information including privacy level information;

means for assembling the cohesive diary page by dynamically combining the content data and the page design in accordance with the configuration information; and means for displaying a diary page, by the diary program running in the browser.

* * * * *

UNITED STATES PATENT AND TRADEMARK OFFICE
CERTIFICATE OF CORRECTION

PATENT NO.    : 6,415,316 B1
DATED         : July 2, 2002
INVENTOR(S)   : Joannes Jozef Everardus van der Meer It is certified that error appears in the above-identified patent and that said Letters Patent is hereby corrected as shown below:

Column 24,
Line 54, replace ";" with a -- : --.
Line 55, replace the word "use" with -- user --.

Column 26,
Line 30, add -- , -- after the word "data".

Column 28,
Line 6, replace "top" with the word -- the --.

Signed and Sealed this

Twelfth Day of November, 2002

Attest:

JAMES E. ROGAN
Attesting Officer    Director of the United States Patent and Trademark Office